(12) United States Patent
Six et al.

(10) Patent No.: US 10,584,765 B2
(45) Date of Patent: Mar. 10, 2020

(54) DYNAMIC FORCE GENERATOR COMPRISING AT LEAST TWO UNBALANCED MASSES AND ACTUATOR COMPRISING SAID GENERATORS

(71) Applicant: Hutchinson, Paris (FR)

(72) Inventors: Marc François Six, Corquilleroy (FR); Gérard Tavin, Angers (FR)

(73) Assignee: Hutchinson, Paris (FR)

( * ) Notice: Subject to any disclaimer, the term of this patent is extended or adjusted under 35 U.S.C. 154(b) by 0 days.

(21) Appl. No.: 15/936,979

(22) Filed: Mar. 27, 2018

(65) Prior Publication Data
US 2018/0283493 A1 Oct. 4, 2018

(30) Foreign Application Priority Data
Mar. 28, 2017 (FR) .................... 17 52598

(51) Int. Cl.
| F16F 15/00 | (2006.01) |
| F16F 15/22 | (2006.01) |
| B64C 27/00 | (2006.01) |

(52) U.S. Cl.
CPC .......... F16F 15/223 (2013.01); B64C 27/001 (2013.01); *B64C 2027/004* (2013.01)

(58) Field of Classification Search
CPC ...... B64C 27/001; B64C 27/00; H02K 16/00; H02K 1/27; G05D 19/02; F16F 15/223; F16F 15/22
See application file for complete search history.

(56) References Cited

U.S. PATENT DOCUMENTS

| 5,005,439 A | * | 4/1991 | Jensen | .................. F16F 15/22 248/550 |
| 9,073,627 B2 | | 7/2015 | Jolly et al. | |

(Continued)

FOREIGN PATENT DOCUMENTS

| EP | 0409462 | 1/1991 |
| EP | 2926026 A1 | 10/2015 |

(Continued)

OTHER PUBLICATIONS

International Search Report and Written Opinion for International Application No. PCT/US2013/071427 dated May 22, 2014, 14 pages.

*Primary Examiner* — Mang Tin Bik Lian
*Assistant Examiner* — Leda T Pham
(74) *Attorney, Agent, or Firm* — Alston & Bird LLP

(57) ABSTRACT

Provided is a dynamic force generator having a supporting shaft, a first rotor including an internal bore housing the supporting shaft and bearings arranged between the supporting shaft and the internal bore so that the first rotor is mounted rotatably in relation to the supporting shaft, an external bore having an inner face provided with a first set of permanent magnets. A first unbalanced mass is within the internal bore of the first rotor and mounted opposite an outer face of the external bore of the first rotor. A second rotor is mounted rotatably in relation to the first rotor, via an antifriction component provided between the first rotor and the second rotor, and includes an internal bore housing the internal bore of the first rotor so that the internal bores of the first and second rotors are concentric, and an external bore with a second set of permanent magnets.

18 Claims, 13 Drawing Sheets

(56) References Cited

U.S. PATENT DOCUMENTS

2010/0034655 A1* 2/2010 Jolly .................... B64C 27/001
                                                                416/145
2011/0027081 A1    2/2011 Jolly et al.
2015/0321753 A1   11/2015 Black et al.

FOREIGN PATENT DOCUMENTS

WO    WO 2009/055007 A2    4/2009
WO    WO 2014/085236 A1    6/2014

* cited by examiner

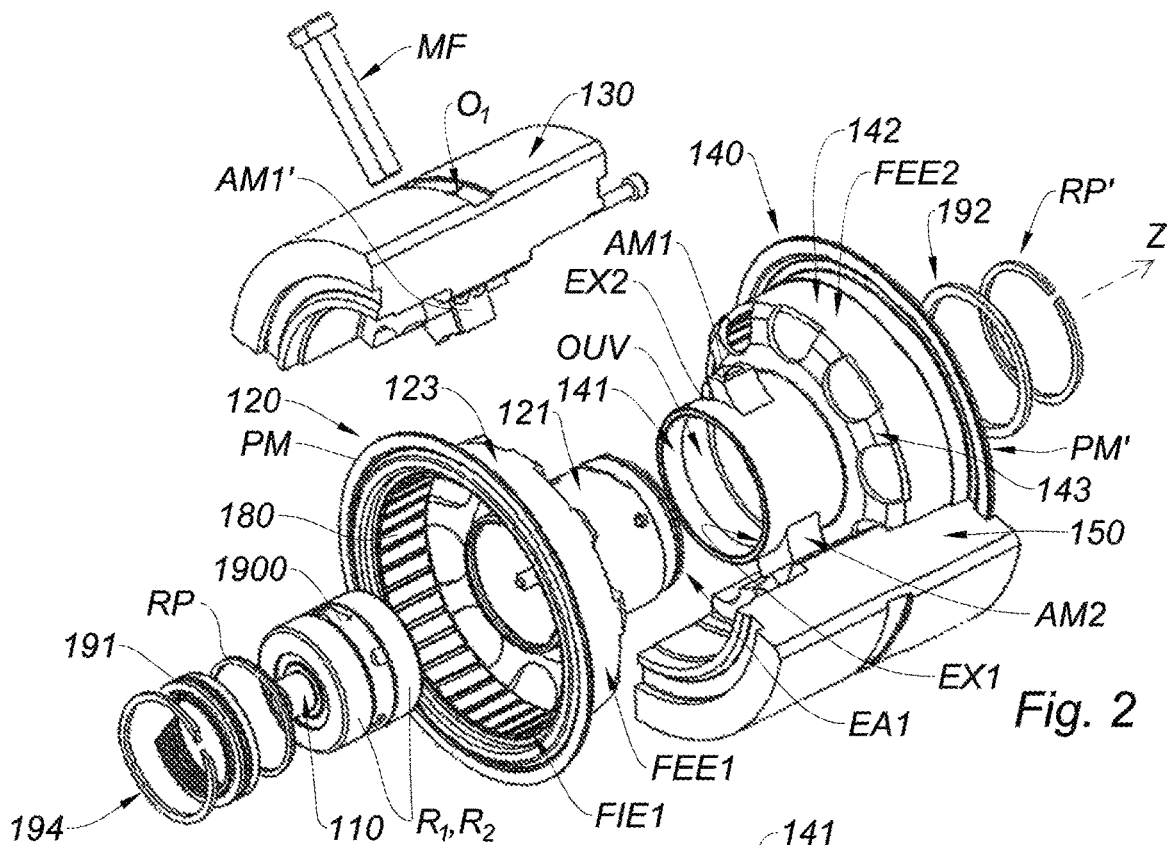
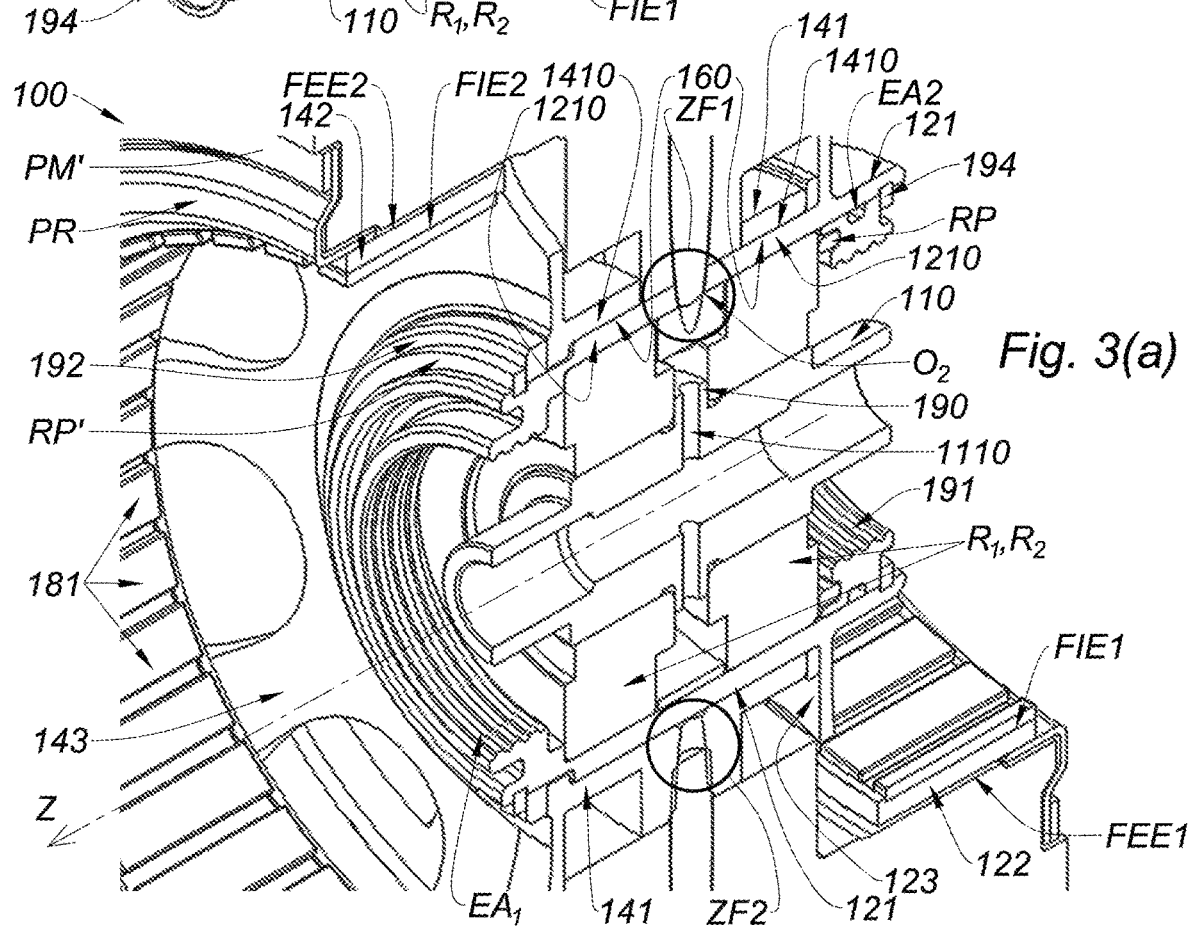
Fig. 2
Fig. 3(a)

DYNAMIC FORCE GENERATOR COMPRISING AT LEAST TWO UNBALANCED MASSES AND ACTUATOR COMPRISING SAID GENERATORS

FIELD

The invention relates to a dynamic force generator comprising at least two unbalanced masses and an actuator comprising said generators.

BACKGROUND

Numerous dynamic force generators with unbalanced masses are known.

An unbalanced mass is a mass that is off-centre relative to the rotation axis of the dynamic force generator.

In this type of dynamic force generator, the unbalanced masses are set in rotation to generate a centrifugal force, the resultant of which makes it possible, in practice, to counteract a vibration generated in a structure.

In particular, in the field of aircraft, the engines generate vibrations, which we aim to decrease or at least limit.

This is notably the case for rotating-wing aircraft (helicopters). In fact, the rotor (main or secondary as applicable) providing lift for the helicopter generates many vibrations, notably on the fuselage, that it is necessary to counteract.

For these applications in particular, the use of a dynamic force generator with at least two unbalanced masses is attractive as the generators are relatively light and compact, compared to other classes of dynamic force generators.

Documents U.S. Pat. No. 5,005,439, EP 2 926 026 or U.S. Pat. No. 9,073,627 propose various designs of dynamic force generators with at least two unbalanced masses.

However, there are constant efforts to improve dynamic force generators of this type, notably to reduce their weight, make them more compact (reduced overall dimensions), but also to improve their service life.

SUMMARY

One aim of the invention is to propose an improved dynamic force generator with at least two unbalanced masses.

In particular, a more precise aim of the invention is to propose a dynamic force generator with at least two unbalanced masses with reduced weight and overall dimensions and improved service life.

Another aim is to propose an actuator comprising said generators.

For this purpose, the invention proposes a dynamic force generator comprising a supporting shaft;

a first rotor comprising an internal bore housing said supporting shaft and at least two bearings or, as appropriate, at least two rows of needle rollers, arranged between the supporting shaft and the internal bore so that the first rotor is mounted rotatably in relation to said supporting shaft, an external bore offset radially and axially relative to the internal bore and comprising an inner face either provided with a first set of permanent magnets or ribbed and made of ferromagnetic material, a connecting zone between the internal and external bores of the first rotor, said connecting zone being able to define, with the external bore, a space intended for housing an electromagnet able to interact with the first set of permanent magnets or, as appropriate, with said ribbed inner face made of ferromagnetic material of the external bore of this first rotor, in order to constitute an electric motor for the first rotor, a first unbalanced mass fixed to or formed integrally with the internal bore of the first rotor and mounted opposite an outer face of the external bore of the first rotor;

a second rotor mounted rotatably in relation to the first rotor, via an antifriction component provided between the first rotor and the second rotor, said second rotor comprising:

an internal bore housing the internal bore of the first rotor, so that said internal bores of the first and second rotors are concentric, an external bore offset radially and axially relative to the internal bore and comprising an inner face either provided with a second set of permanent magnets, or ribbed and made of ferromagnetic material, a connecting zone between the internal and external bores of the second rotor, said connecting zone being able to define, with the external bore, a space intended for housing an electromagnet able to interact with the second set of permanent magnets or, depending on circumstances, said ribbed inner face made of ferromagnetic material of the external bore of this second rotor, in order to constitute an electric motor for the second rotor; and a second unbalanced mass fixed to or formed integrally with the internal bore of the second rotor and mounted opposite an outer face of the external bore of the second rotor.

This dynamic force generator may also have at least one of the following features, taken alone or in combination:

said antifriction component is a plain bearing, employing, for example, an antifriction coating, a surface treatment or preferably a sleeve bearing arranged between the internal bore of the first rotor and the internal bore of the second rotor;

said antifriction component comprises at least two rows of needle rollers arranged between the internal bore of the first rotor and the internal bore of the second rotor;

the bearings or, as appropriate, the rows of needle rollers arranged between the supporting shaft and the internal bore of the first rotor and/or the antifriction component is(are) centred axially;

the bearings arranged between the supporting shaft and the internal bore of the first rotor are selected from ball bearings, needle-roller bearings or taper roller bearings, preferably taper roller bearings;

the external bore of the first and/or of the second rotor is made of a ferromagnetic material;

a first axial end of the internal bore of the first rotor, located opposite the corresponding connecting zone, is in the form of at least one helicoidal groove with pitch oriented so as to cause grease contained in said generator to return to the bearings or, as appropriate, to the rows of needle rollers;

a component located against a peripheral wall of the internal bore of the first rotor, said peripheral wall forming a second axial end of the internal bore of the first rotor, opposite the first axial end, said component being provided with at least one helicoidal groove having a pitch opposite to that of the axial end of the internal bore of the first rotor;

the external bore of the first and/or of the second rotor comprises a magnetic track, for example of annular shape, for each of the first and second rotors, it comprises a temperature sensor, advantageously arranged on the supporting shaft;

the generator comprises at least one permanent magnet, called indexing magnet, arranged to hold the unbalanced masses in opposition, at an angle of 180°, when the generator is at rest, and for this purpose said unbalanced masses are either made of a ferromagnetic material or of a non-magnetic material but then comprising a ferromagnetic plate;

the unbalanced masses are adjacent or nested;

when the unbalanced masses are adjacent, at least one of said unbalanced masses comprises, on at least one of its lateral faces, a damping means, for example a rubber component;

when the unbalanced masses are adjacent, each unbalanced mass has a section, taken in a plane perpendicular to the direction of the supporting shaft in the form of a half-segment of a disk.

The invention also relates to an actuator comprising:

at least two dynamic force generators according to the invention arranged so that their supporting shafts are parallel;

a housing; and for each of the two dynamic force generators:

at least one first electromagnet, fixed on the housing and housed in a space formed between said housing, the external bore and the connecting zone between the internal and external bores of the first rotor of the dynamic force generator in question, so that said at least one first electromagnet is located facing the first set of permanent magnets or, as appropriate, with said ribbed inner face made of ferromagnetic material of the external bore;

at least one second electromagnet, fixed on the housing and housed in a space formed between said housing, the external bore and the connecting zone between the internal and external bores of the second rotor of the dynamic force generator in question, so that said at least one second electromagnet is located facing the second set of permanent magnets or, as appropriate, with said ribbed inner face made of ferromagnetic material of the external bore.

The actuator may comprise at least one of the following features, taken alone or in combination:

the supporting shaft of each dynamic force generator is fixed on the housing;

the actuator comprises a circuit board mounted between the housing and each electromagnet;

the circuit board comprises, for each rotor provided with a series of permanent magnets, three Hall cells and a position sensor able to supply information on angular position at each turn of the rotor in question, for example a top tour sensor.

BRIEF DESCRIPTION OF THE DRAWINGS

The invention will be better understood and other aims, advantages and features thereof will become clearer on reading the description given hereunder, made with reference to the following appended figures.

FIG. 2 is an exploded view of a dynamic force generator of the actuator shown in FIG. 1;

FIGS. 3(a) and 3(b) show different sectional views of the dynamic force generator, part of which is shown in FIG. 1, namely more precisely a sectional view in FIG. 3(a), a partial sectional view in FIG. 3(b) along the cutting plane in FIG. 3(a);

FIG. 4, which comprises

FIG. 10, which comprises

DETAILED DESCRIPTION

The appended figures are shown with reference to an orthogonal coordinate system (O; X, Y, Z). The Z axis corresponds to the longitudinal axis of the dynamic force generator and the plane (X; Y) orthogonal to the longitudinal axis makes it possible to define any radial direction.

Figure 1:
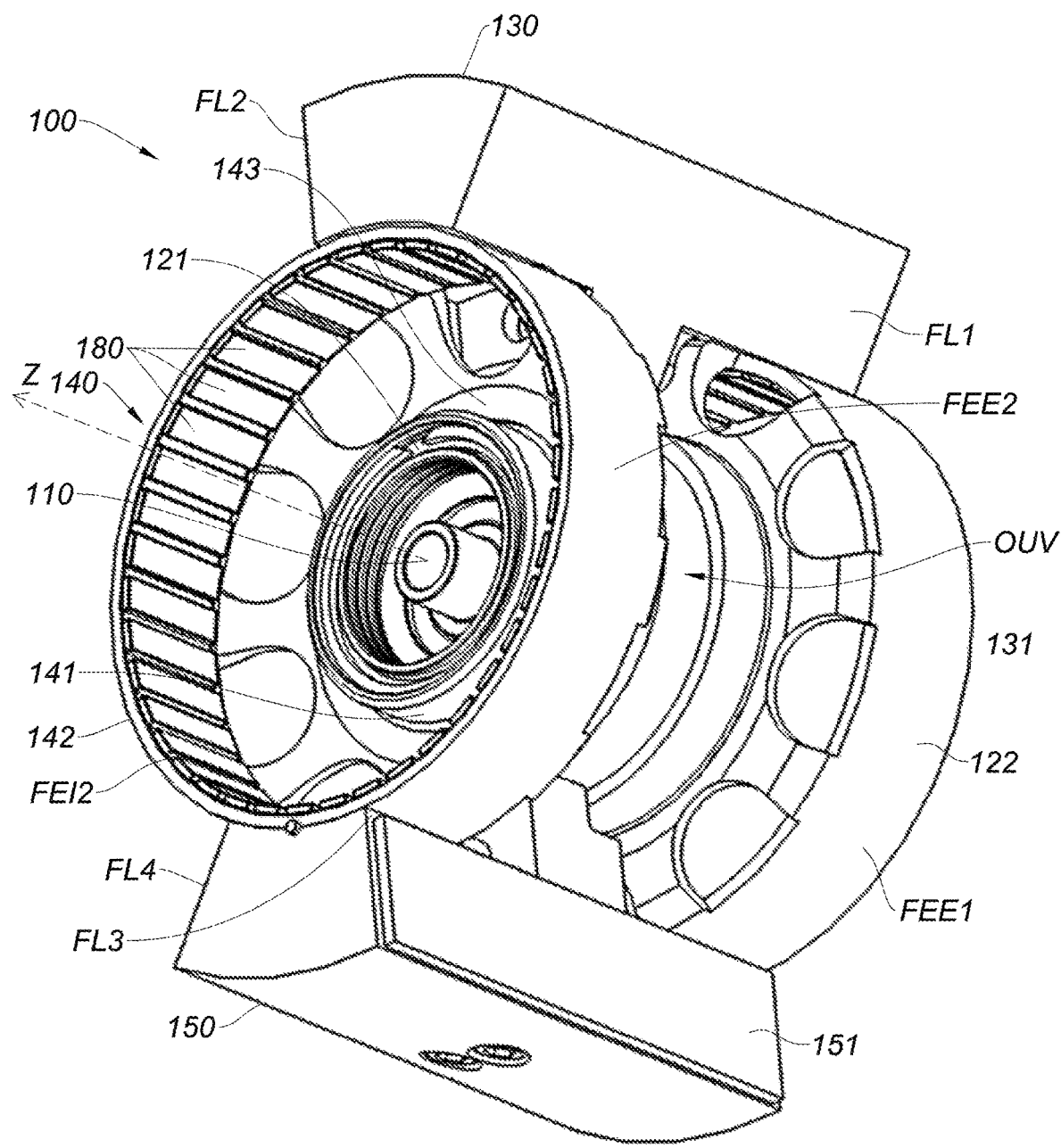
FIG. 1 is an external perspective view of part of a dynamic force generator according to a first embodiment of the invention.
Figure 3B:
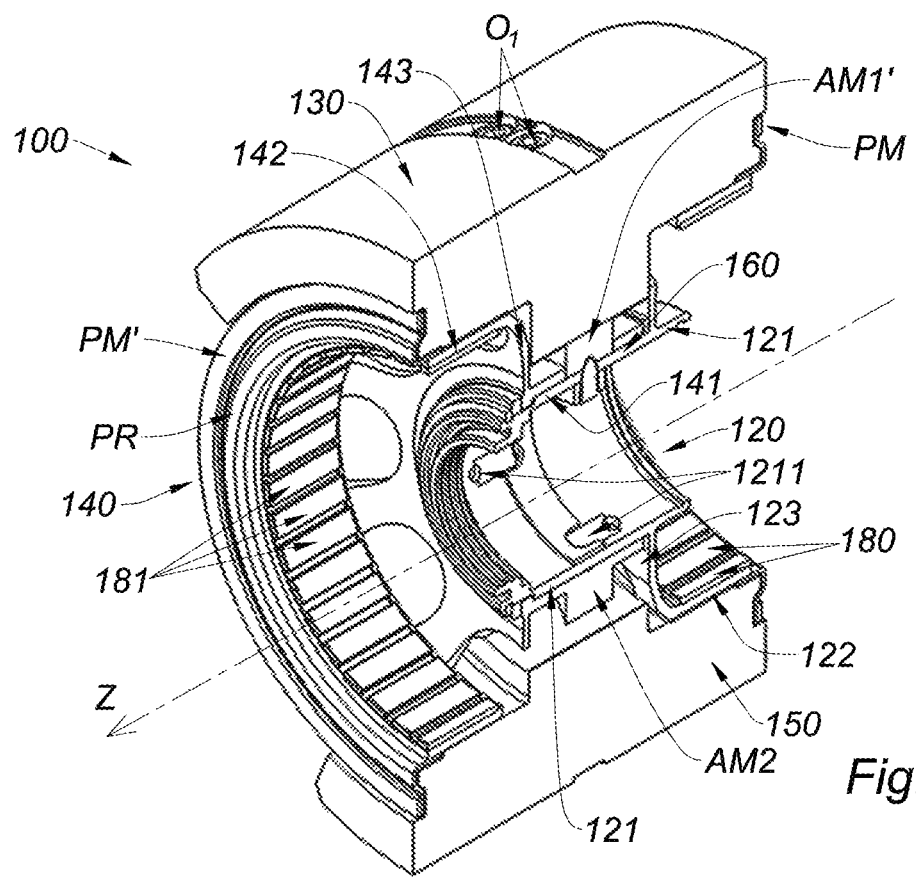

A dynamic force generator 100 according to the invention is shown in FIGS. 1 to 3.

The dynamic force generator 100 comprises a supporting shaft 110, which is intended to be fixed to a housing.

The dynamic force generator 100 also comprises a first rotor 120.

The first rotor 120 comprises an internal bore 121 housing said supporting shaft 110 and bearings R1, R2 arranged between the supporting shaft 110 and the internal bore 121 so that the first rotor 120 is mounted rotatably in relation to said supporting shaft 110. The direction of extension of the supporting shaft 110 makes it possible to define the longitudinal direction (Z axis).

The first rotor 120 comprises an external bore 122.

This external bore 122 is offset radially relative to the internal bore 121. The external bore 122 therefore has a larger diameter than the internal bore 121. Moreover, the external bore 122 is also offset axially relative to the internal bore 121.

The external bore 122 comprises an inner face FIE1 provided with a first set of permanent magnets 180. The magnets are therefore arranged following one another on a face, namely the face FIE1, in the form of a ring. Moreover, the permanent magnets have alternating polarity on passing over this peripheral face. Furthermore, the polarization of the magnets is oriented to act radially. These magnets may be made of NdFeB, notably when we wish to obtain the best performance (torque) with the smallest possible mass and overall dimensions. This external bore 122 may be used for mounting thereon, for example by means of an inserted component, a magnetic track PM, in this instance in the form of a ring, which can serve for implementing an angular position sensor, as will be explained hereunder.

The first rotor 120 comprises a connecting zone 123 between the internal bore 121 and external bore 122 of the first rotor. This connecting zone 123 therefore extends essentially radially. Owing to the axial and radial offset of the external bore 122 relative to the internal bore 121, the connecting zone 123 is able to define, with the external bore 122, a space housing an electromagnet 170 able to interact with the first set of permanent magnets 180 in order to constitute an electric motor for the first rotor 120. This will be explained in more detail hereunder. However, it is noted that, advantageously, the connecting zone 123 is of openwork to reduce the mass and improve the cooling of the electromagnet.

The dynamic force generator 100 also comprises a first unbalanced mass 130 fixed to the internal bore 121 of the first rotor 120. The fixation zone ZF1 is shown in FIG. 3(a). This fixation is carried out by means of an opening O1 passing through the first unbalanced mass 130 and another opening O2 made in the internal bore 121 of the first rotor 120. These openings O1, O2 make it possible for a fixing means MF, for example consisting of bolts and/or lag-screws, to be passed through. "Unbalanced mass" is to be understood as a mass that is radially off-centre relative to a longitudinal axis of the dynamic force generator 100.

Furthermore, the first unbalanced mass 130 is mounted opposite an outer face FEE1 of the external bore 122 of the first rotor 120. Accordingly, the first unbalanced mass 130 is in the immediate vicinity of the first set of permanent magnets 180. In fact, the first unbalanced mass 130 and the first set of permanent magnets 180 are located on either side of the external bore 122 of the first rotor 120. In this respect, it is advantageous to envisage that the external bore 122 of the first rotor 120 comprises a ferromagnetic material or, preferably, is made of a ferromagnetic material. In fact, when the external bore 122 of the first rotor 120 is ferromagnetic, this makes it possible to loop the magnetic flux of the permanent magnets of the rotor. This therefore increases the level of induction in the rotor/stator air gap and channels the magnetic flux.

Moreover, the dynamic force generator 100 comprises a second rotor 140 mounted rotatably in relation to the first rotor 120.

This setting in rotation is made possible by means of an antifriction component. This antifriction component, regardless of the embodiment envisaged and described hereunder, offers the advantage of being more compact relative to the conventional use of bearings. It also gives a weight saving.

For example, the antifriction component may be a plain bearing 160 provided between the first rotor 120 and the second rotor 140.

Moreover, the second rotor 140 comprises an internal bore 141 housing the internal bore 121 of the first rotor 120, so that said internal bores 121, 141 of the first and second rotors 120, 140 are concentric.

Owing to this design, and as shown in FIGS. 1 to 3, the plain bearing 160 employs an antifriction coating deposited on at least one of the opposite surfaces 1210, 1410 of the internal bore 121 of the first rotor 120 and of the internal bore 141 of the second rotor 140. This antifriction coating makes it possible to reduce the friction of the plain bearing.

As a variant, the plain bearing 160 employs a surface treatment, for example for the purpose of surface hardening of at least one of the surfaces 1210, 1410. This hardening may be achieved by ionic nitriding. This hardening notably makes it possible to increase the service life of the plain bearing and may moreover contribute to further reduction of the friction of the plain bearing.

A plain bearing of this kind may be provided on the two surfaces 1210, 1410.

In this case, it should be noted that the type of plain bearing used on one of the surfaces 1210, 1410 may be different from what is used on the opposite surface.

Thus, a first antifriction coating may be provided on one of the two surfaces 1210, 140 and a second antifriction coating, different from the first antifriction coating, on the other surface.

Moreover, a first surface treatment may thus be provided on one of the two surfaces 1210, 1410 and a second surface treatment, different from the first surface treatment, on the other surface.

It is also possible to provide a surface treatment on surface 1210 and an antifriction coating on the other surface 1410 or vice versa.

Whatever type of plain bearing is used, one of its advantages is its coefficient of friction with the bores in question. Typically, this coefficient of friction may be between 0.03 and 0.05, without supplying a lubricant of the oil or grease type.

Another variant embodiment of said plain bearing 160 will be described later with reference to FIG. 5.

Moreover, it should be noted that the internal bore 141 of the second rotor 140 comprises a peripheral opening OUV, extending, for example, at an angle less than or equal to 180°, advantageously of 180°. This peripheral opening comprises two ends EX1, EX2.

As the internal bore 141 of the second rotor 140 houses the internal bore 121 of the first rotor, the inside diameter of the internal bore 141 of the second rotor 140 is slightly larger than the outside diameter of the internal bore 121 of the first rotor and accordingly the opening OUV allows the fixing means MF to be passed through so that the first unbalanced mass 130 can be fixed effectively to the internal bore 121 of the first rotor 120. Moreover, the fixing means MF also passes through holes O3 (cf. FIG. 6 for example, where just one is visible, knowing for example that each bolt and/or lag-screw will pass through one of these holes) of the first rotor 120 to provide its fixation.

The second rotor 140 also comprises an external bore 142.

The external bore 142 is offset radially relative to the internal bore 121. The external bore 142 therefore has a larger diameter than the internal bore 141. Moreover, the external bore 142 is also offset axially relative to the internal bore 141.

The external bore 142 comprises an inner face FIE2 provided with a second set of permanent magnets 181. The magnets are therefore arranged following one another on a face, namely the face FIE1, in the form of a ring. Moreover, the permanent magnets have alternating polarity on passing over this peripheral face. Moreover, the polarization of the magnets is oriented to act radially. These magnets may be made of NdFeB, notably when we wish to obtain the best performance (torque) with the smallest possible mass and overall dimensions. The external bore 142 may be used for mounting thereon, for example by means of an inserted component, a magnetic track PM', in this instance in the form of a ring, which may serve for implementing an angular position sensor, as will be explained hereunder.

The second rotor 140 also comprises a connecting zone 143 between the internal bore 141 and the external bore 142 of the second rotor. The connecting zone 143 therefore extends essentially radially. Owing to the radial and axial offset of the external bore 142 relative to the internal bore 141, the connecting zone 143 makes it possible to define, with the external bore 142, a space housing an electromagnet 171 that is able to interact with the second set of permanent magnets 181 in order to constitute an electric motor for the second rotor 140. As shown, the connecting zone 143 is advantageously of openwork to reduce the weight and promote cooling of the electromagnet.

Finally, the dynamic force generator 100 comprises a second unbalanced mass 150 fixed to the internal bore 141 of the second rotor 140. The fixation zone ZF2 is shown in FIG. 3(a).

Furthermore, the second unbalanced mass 150 is mounted opposite an outer face FEE2 of the external bore 142 of the second rotor 140. Accordingly, the second unbalanced mass 140 is in the immediate vicinity of the second set of permanent magnets 181. In fact, the second unbalanced mass 150 and the second set of permanent magnets 181 are located on either side of the external bore 142 of the second rotor 140. In this respect, it is advantageous for this external bore 142 of the second rotor 140 to comprise a ferromagnetic material or to be made of a ferromagnetic material.

The two unbalanced masses 130, 150 advantageously have an identical mass. This may, for example, be obtained by defining unbalanced masses 130, 150 on the one hand with identical shapes and on the other hand made of identical material. For example, the unbalanced masses 130, 150 may advantageously be made of the same grade of tungsten.

The bearings R1, R2 may be ball bearings, needle-roller bearings or taper roller bearings.

However, among the conceivable bearings, they will advantageously be taper roller bearings, to withstand the load better and/or for compactness. In fact, the basic dynamic load of a taper roller bearing is higher than for the other types of bearings, with identical overall dimensions. In the case when taper rollers R1, R2 are envisaged, their shape means that, in use, the centrifugal force applied by the unbalanced masses gives rise to an axial component. In order to keep the taper rollers R1, R2 in place, but also permanently guarantee absence of play in the bearing, it is then advantageous to employ a preloading spring RP (axial preloading), preferably of annular shape against at least one of the taper rollers R1, R2, which is fitted with a circlip 194. In practice, the level of axial preloading is selected so as to compensate the axial component of force generated, in use, by the maximum centrifugal force.

The spacing between the two bearings R1, R2 is provided on the one hand by a projection 190, extending radially and made on the shaft 110 and on the other hand by a spacer 1900.

Figure 3C:
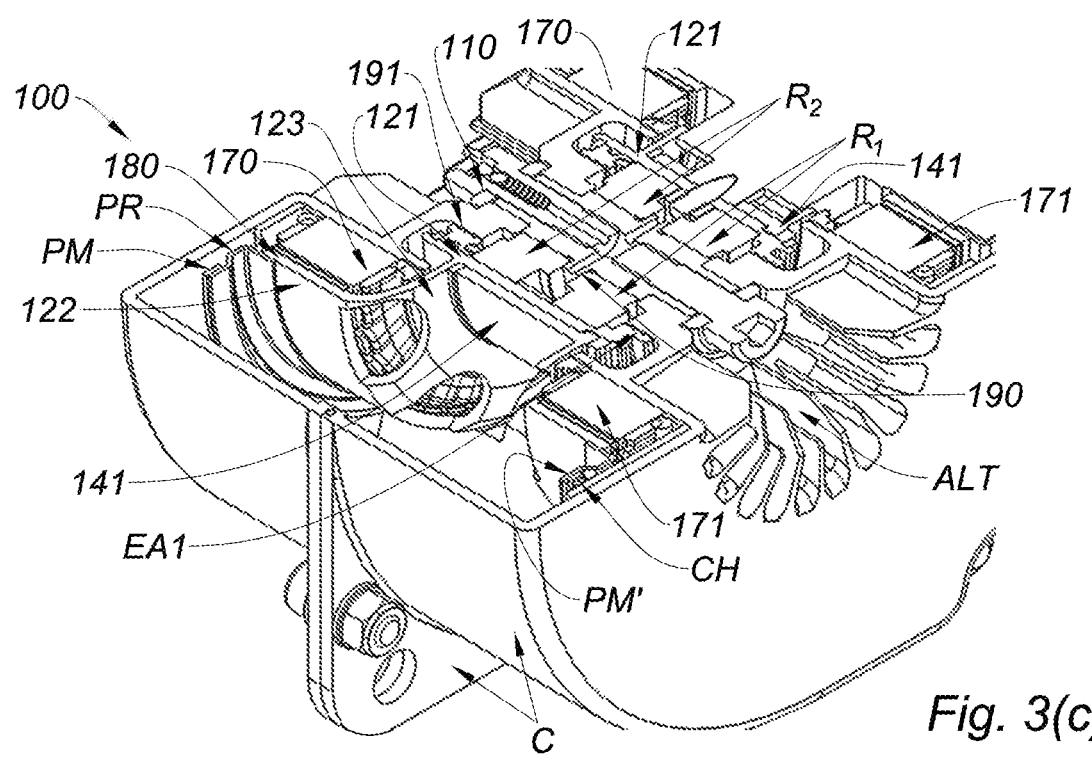
FIG. 3(c) is an enlarged partial sectional view of an actuator comprising two dynamic force generators as shown in FIGS. 3(a) and 3(b), along a cutting plane perpendicular to the cutting plane in FIG. 3(a) at the level of one of the dynamic force generators.
Figure 7:
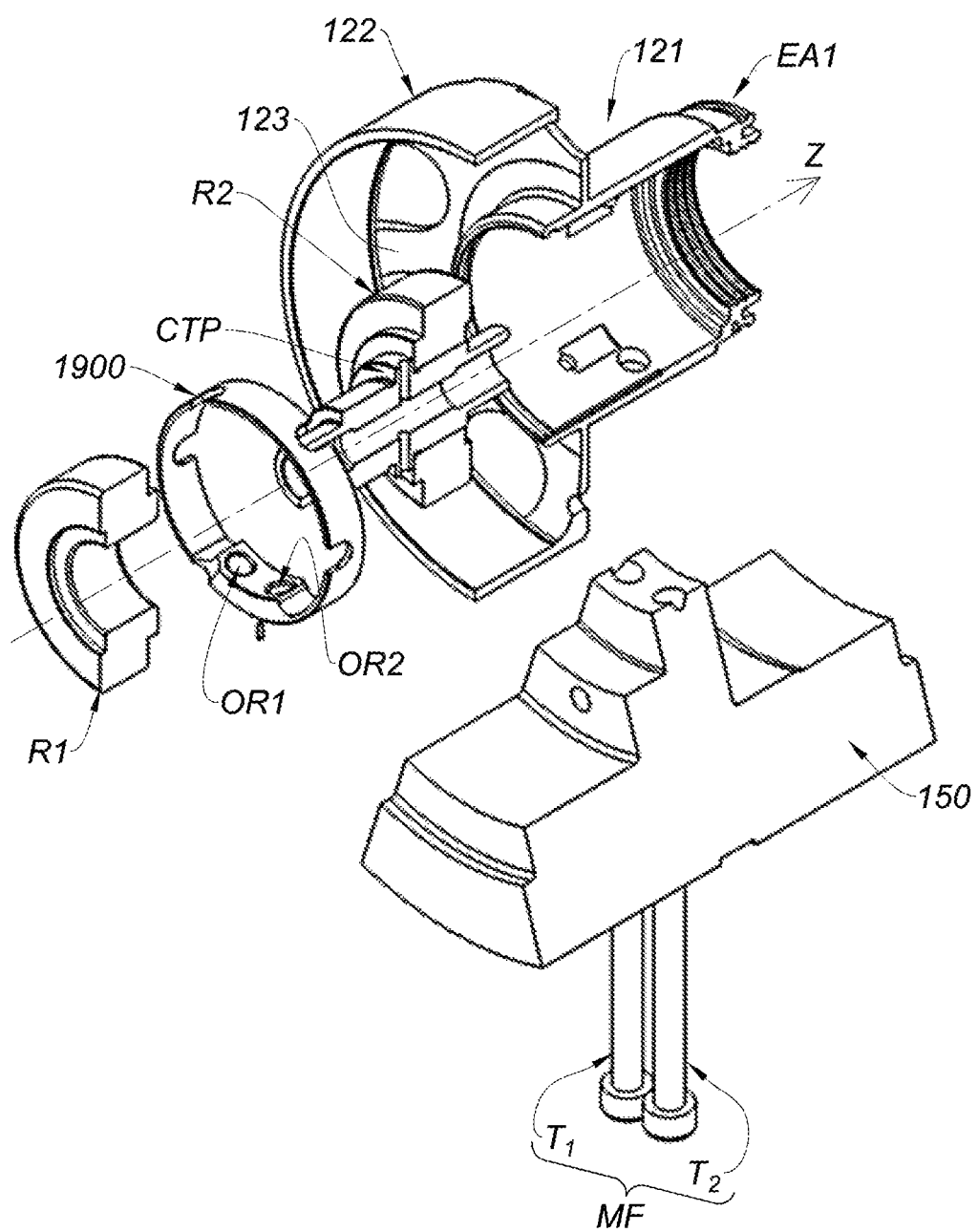
FIG. 7 is an exploded partial view of a dynamic force generator as shown in FIGS. 1 to 3.

This spacer 1900 is more easily identifiable in FIG. 7 (but also in FIGS. 3(a) and 3(c) in particular), FIG. 7 being a partial exploded view of the dynamic force generator 100. The spacer 1900 is intended to engage with lag-screws with the fixing means MF, in this case lag-screws T1, T2, passing through the unbalanced mass and comprising for this purpose holes OR1, OR2, which are, for example, in the form of threaded holes forming a double nut.

Moreover, the actual shape of the internal bores 121, 141 prevents these bearings R1, R2 going outwards, i.e. more precisely in an outer radial direction. In the axial direction, only the internal bore 121 creates a stop.

It should be noted that the central shaft 110 is advantageously hollow, and comprises at least one through-slot 1110 made radially. This is advantageous for maintenance, to allow easier regreasing of the bearings R1, R2 by an operator.

Holes 1211 having the same function are then advantageously envisaged in the internal bore 121 of the first rotor 120.

Moreover, it may be envisaged that the axial end EA1 of the internal bore 121 of the first rotor 120 located opposite the corresponding connecting zone 123 has the form of at least one helicoidal groove. This helicoidal groove has a sealing function. In fact, if there is migration of the lubricating grease from the bearings R1, R2, the direction of the pitch of this helicoidal groove is oriented so as to return the grease to the centre of the dynamic force generator 100, and finally to the bearings R1, R2.

A circlip 192 is provided to ensure axial blocking of the second rotor 140, and more particularly of the internal bore 141 of the second rotor 140, relative to the end EA1 of the internal bore 121 of the first rotor 120. It should be noted that this end EA1 is then advantageously utilized for compressing and axially blocking the preloading spring RP', and in fact the circlip 192, against the bore 141.

A component 191, also provided with at least one helicoidal groove with pitch opposite in direction to the preceding, is then advantageously envisaged against a peripheral wall of the internal bore 121 of the first rotor. This peripheral wall forms the axial end EA2 of this internal bore 121, opposite the axial end EA1. This axial end EA2 is therefore arranged beside the corresponding connecting zone 123 of the first rotor 120. The fact that the component 191 is located at the level of the end EA2 opposite to the end EA1 and is of opposite pitch to the helicoidal groove of this end EA1 allows it to fulfil an identical function, namely to return the grease to the bearings R1, R2.

Once again, a circlip 194 is provided to ensure that this component 191 is held in place axially relative to the internal bore 121 of the first rotor 120. It should be noted that this component 191 is then advantageously utilized for compressing and axially blocking the preloading spring RP against one, R2, of the bearings R1, R2.

Advantageously, and as shown in FIGS. 1 to 3, we may envisage employing one or more permanent magnets AM1, AM2, called indexing magnets, arranged to hold the unbalanced masses 130, 150 in opposition, at an angle of or close to 180°.

This is notably useful when the dynamic force generator 100 is not in operation (is at rest).

For this, either a single permanent magnet may be provided, or two permanent magnets AM1, AM2 of opposite polarity on the internal bore 141 of the second rotor 140. The or each magnet AM1, AM2 is advantageously arranged near the ends EX1, EX2 of the peripheral opening OUV of the internal bore 141 of the second rotor 140.

In FIG. 2, it may be noted that there is a plate AM1' made of ferromagnetic material, intended to interact with the permanent magnets AM1, AM2 in the case of an unbalanced mass of non-magnetic material. If the material forming an unbalanced mass is ferromagnetic, said plate AM1' is no longer necessary.

This makes it possible to ensure, when the dynamic force generator 100 is switched on, that starting takes place at low or zero unbalanced mass when the respective masses of the unbalanced masses 130, 150 are identical, without a particular strategy for controlling the motors.

In fact, on starting, the resultant of the centrifugal force generated by the pair of unbalanced masses remains zero. As a result, on starting, application of certain vibrational modes of the dynamic force generator 100 is avoided while using a minimum of current and power at the level of the motors. More precisely, the unbalanced masses thus being linked at start-up, the motors do not then independently oppose the torque oscillations created by their associated unbalanced mass. This makes it possible to reduce the oscillations of current at the rotation frequency, all the more because the rotary speed is then relatively low. This is even more useful when the environment increases the losses (for example: very cold) and requires an increase in torque and/or power when starting.

Each unbalanced mass 130, 150 comprises two lateral faces FL1, FL2, FL3, FL4. At least one of these lateral faces is provided with a damping means 151, for example a rubber component. In fact, as the unbalanced masses are arranged adjacently, they may come into contact with one another. Thus, the damping means is useful for preventing excessive impact between two lateral faces (FL1, FL3, for example) of the two unbalanced masses 130, 150.

It should be noted that the "adjacent" configuration of the unbalanced masses 130, 150 makes it possible to prevent the generation of parasitic moments within the generator. In fact, in operation, the first unbalanced mass 130 generates a (radial) centrifugal force passing through its centre of gravity and the supporting shaft 110. The same applies to the other unbalanced mass 150. However, owing to this "adjacent" mounting, the forces generated by the two unbalanced masses pass through the same point at the level of the supporting shaft 110.

It should also be noted that mounting the unbalanced masses 130, 150 in pairs inside the dynamic force generator 100 makes it possible to limit the stresses on the bearings R1, R2 and therefore increase their service life.

In fact, when a dynamic force generator only comprises a single unbalanced mass, in operation the bearings are always subject to radial stresses.

This is not the case with a pair of unbalanced masses 130, 150 in one and the same dynamic force generator 100. Thus, the bearings R1, R2 are statistically less stressed since the unbalanced masses 130, 150 will, in operation, sometimes be located in phase opposition (180°) with in consequence the application of a reduced (radial) resultant force on the bearings R1, R2. This is all the more advantageous as the dynamic force generator will in general be intended to generate an identical maximum amplitude of dynamic force over a wide range of frequencies. As the force generated by a single unbalanced mass is proportional to the square of its rotation frequency, the gain in terms of standardized life is, to a first approximation, proportional to the ratio $(f_2/f_1)^6$ where $f_1$ and $f_2$ are the minimum and maximum frequencies, respectively, in the frequency range in question. In terms of application, it should be noted that rotating-wing aircraft (helicopters) nowadays tend increasingly to be equipped with a main rotor with variable rotation frequency. Moreover, it should be noted that, for a given service life, with the proposed solution it is possible to reduce the loading capacity of a bearing and thus reduce its weight and overall dimensions.

Finally it will be noted that in FIGS. 1 to 3, the unbalanced masses are fixed to the corresponding internal bore. However, in a variant embodiment, it could be envisaged, although more difficult to achieve technically, for the unbalanced mass 130 to be integral, i.e. formed as a single piece, with the internal bore 121 of the first rotor 120. A similar comment may be made regarding the unbalanced mass 150 and the internal bore 141 of the second rotor 140.

Figure 4A:
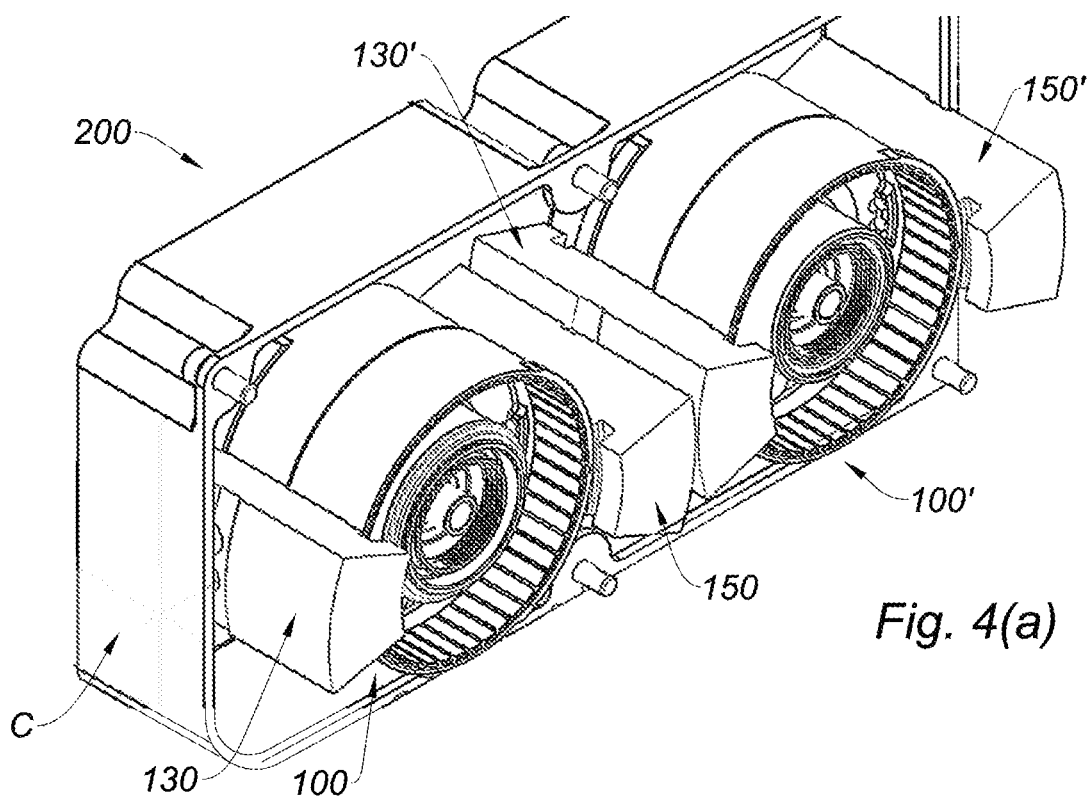
FIGS. 4(a) to 4(c), shows respectively, in FIG. 4(a) a general perspective view of an actuator comprising two dynamic force generators according to FIGS. 1 to 3, in FIG. 4(b) a front sectional view of this actuator in a first operating state and in FIG. 4(c), this same front view of the actuator but in a second operating state.
Figure 4B:
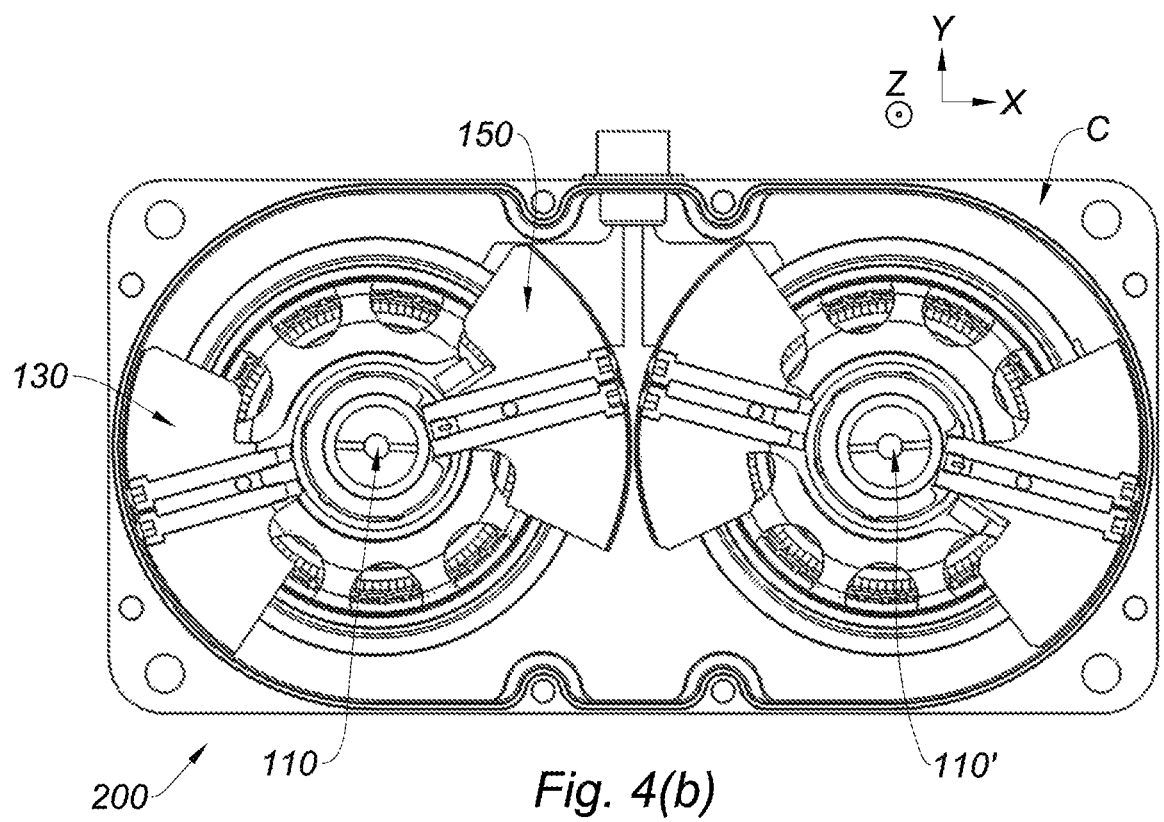

An actuator 200 comprising two dynamic force generators 100, 100', each according to what is shown in FIGS. 1 to 3, is shown in FIG. 4.

Therefore the dynamic force generator 100' is not shown in detail.

More precisely, this actuator 200 comprises:
at least two dynamic force generators 100, 100' as described above, the supporting shafts 110, 110' being arranged in parallel,
a housing C; and
for each of the two dynamic force generators 100, 100':
at least one first electromagnet 170 (electrical coil mounted on its own ferromagnetic component) fixed on the housing C and housed in a space formed between said housing C, the external bore 122, 122' and the connecting zone 123, 123' between the internal bore 121 and the external bore 122 of the first rotor 120 of the generator 100, 100' in question so that said at least one first electromagnet 170 is located facing the first set of permanent magnets 180;
at least one second electromagnet 171 (electrical coil mounted on its own ferromagnetic component) fixed on the housing C and housed in a space formed between said housing C, the external bore 142 and the connecting zone 143 between the internal bore 141 and the external bore 142 of the second rotor 140 of the force generator 100, 100' in question so that said at least one second electromagnet 171 is located facing the second set of permanent magnets 181.

As may be understood, the particular design of a dynamic force generator, notably for each rotor 120, 140, radial and axial offsets between the bores makes it possible to integrate, in a compact manner, an electric motor (electromagnet/permanent magnets).

The supporting shafts 110, 110' may be mounted on the housing C. As a variant, as explained above, it may be envisaged that the supporting shafts 110, 110' are mounted not on the housing C, but on the structure for which we want to reduce the vibrations. In the latter case, the housing is also mounted on the structure for which we want to reduce the vibrations.

In FIG. 4(*a*), the actuator 200 is shown at rest (the unbalanced masses 130, 150 on the one hand and the unbalanced masses 130', 150' on the other hand being positioned in opposition, at 180°).

In FIG. 4(*b*), the actuator 200 is shown in operation, in a position generating a zero overall force (this position is, moreover, comparable to the position of rest illustrated in FIG. 4(*a*)).

Figure 4C:
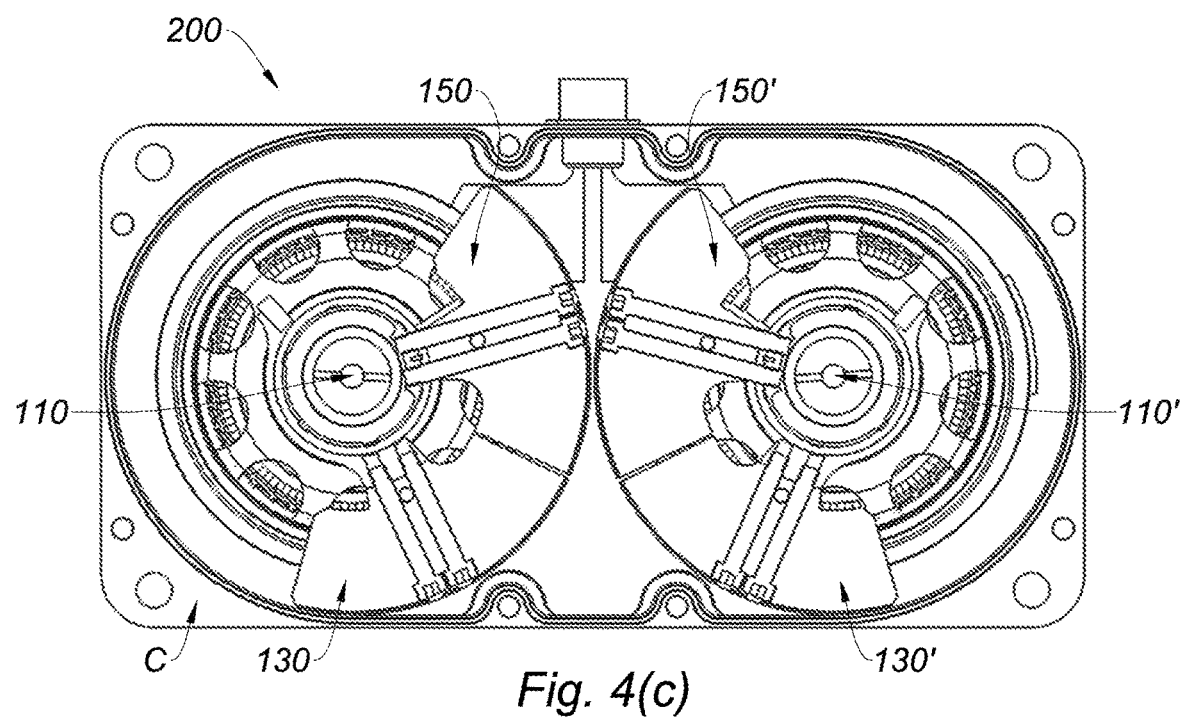

In FIG. 4(c), the actuator 200 is shown in operation, but in a position generating a maximum force.

The actuator 200 may be envisaged such that the supporting shaft 110, 110' of each rotor 120, 140 is fixed on the housing C. Moreover, it is this design that is shown in FIG. 3(c).

However, for each of the two dynamic force generators 100, 100', it is particularly advantageous not to provide any fixation of the supporting shaft 110, 110' on the housing C. In this case, the supporting shaft 110, 110' of each rotor 120, 140 is mounted directly on the structure whose vibrations we want to reduce, for example an aircraft fuselage, notably a fuselage of a rotating-wing aircraft (helicopter). This allows a considerable reduction in weight of the housing C, as in this case the housing C does not have to be designed to withstand the forces generated by each dynamic force generator 100, 100'.

Figure 5:
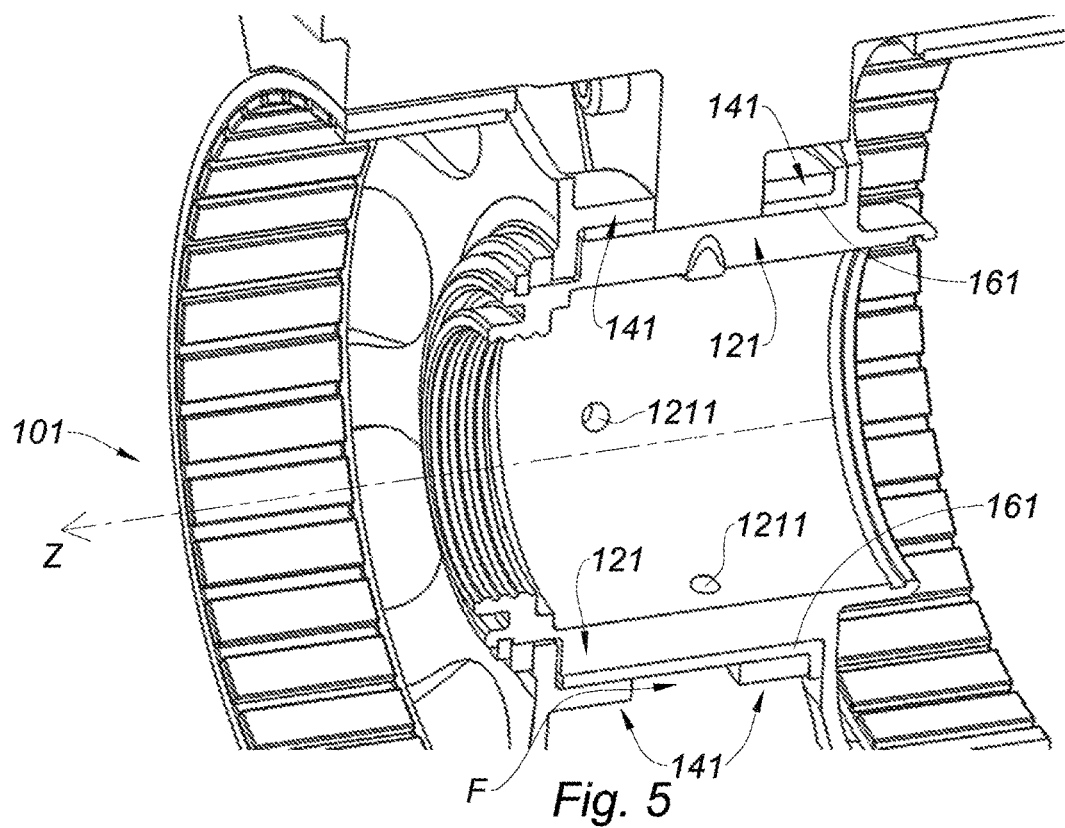
FIG. 5 shows a variant embodiment of the dynamic force generator shown in FIGS. 1 to 3, in a truncated perspective view.

A dynamic force generator 101 according to a variant embodiment is shown in FIG. 5.

In this variant, and relative to what has been described above, only the plain bearing changes. In fact, in this variant embodiment, it is not envisaged to employ an antifriction coating or a surface treatment, but instead a plain bearing of the "sleeve bearing" type 161 arranged between the first rotor 120 and the second rotor 140 and more precisely between the internal bore 121 of the first rotor 120 and the internal bore 141 of the second rotor 140.

This sleeve bearing 161 may, for example, be made of bronze, optionally with graphite inserts. It may, as a variant, be made of steel with a coating or a surface treatment such as those described above.

Relative to the use of an antifriction coating or a surface treatment, the use of a sleeve bearing 161 offers, a priori, the advantage of being certain that the rotors will be able to maintain a rotary motion for a longer time, as this bearing constitutes a wearing component. Moreover, this facilitates maintenance, because when the sleeve bearing 161 is worn out, all that is required is to replace it.

Otherwise, the sleeve bearing offers the same advantages as the other types of plain bearing described above, in particular regarding the expected coefficient of friction with the bores in question.

Figure 6:
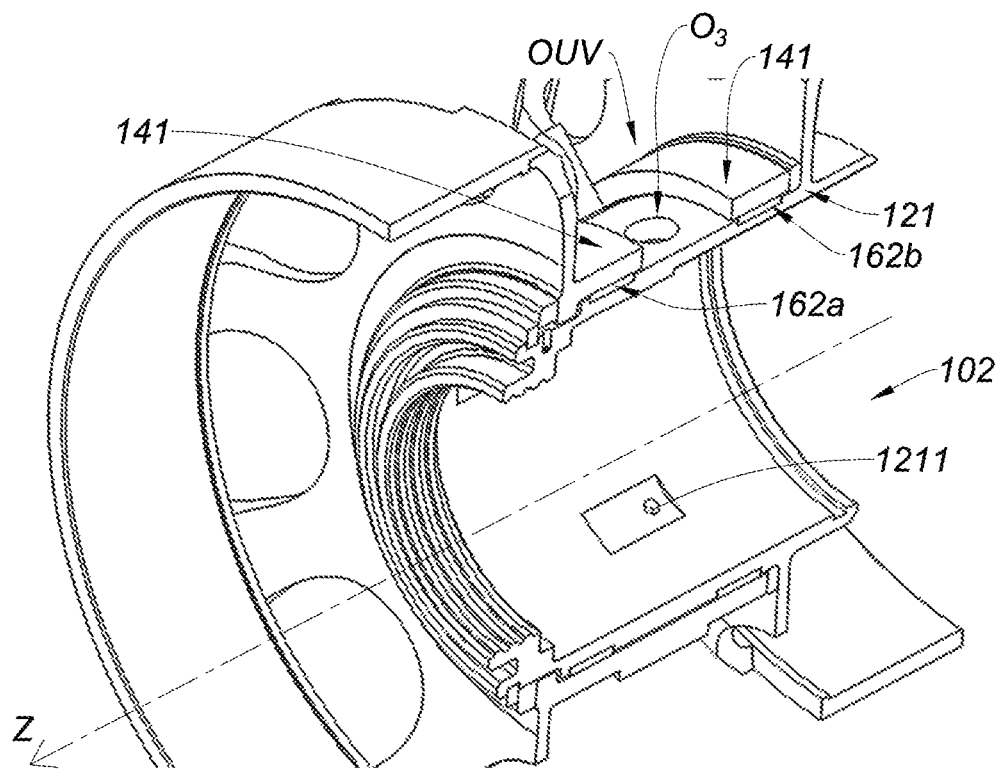
FIG. 6 shows another variant embodiment of the dynamic force generator shown in FIGS. 1 to 3, in a truncated perspective view.

Another dynamic force generator 102 according to another variant embodiment is shown in FIG. 6.

In this variant, and relative to what has been described above with reference to FIGS. 1 to 4, only the antifriction component changes. In fact, in this variant embodiment, it is envisaged to employ at least two rows of needle rollers 162a, 162b (rows of needle rollers alone or with their associated cage to form needle-roller bearings), as the antifriction component. In practice, the plain bearing 160, 161 is therefore replaced with at least two rows of needle rollers, arranged on either side of the hole O3 of the first rotor, and at the same time, of the peripheral opening OUV of the second rotor 140. For this purpose, receptacles for the needle rollers should be provided in the shaft 110.

Relative to the use of a plain bearing, the use of rows of needle rollers 162a, 162b has, a priori, the advantage of being certain that the rotors 120, 140 will be able to maintain a rotary motion for a longer time, in particular even longer than with a sleeve bearing. It should be noted, moreover, that the needle rollers are of relatively small thickness and therefore have little effect, at least relative to the use of a plain bearing, on the overall radial dimensions of the dynamic force generator.

Moreover, with rows of needle rollers, we may envisage a coefficient of friction 10 times lower than with a plain bearing, and therefore typically between 0.003 and 0.005, other things being equal.

This is advantageous because, in operation, in practice less power will have to be supplied to alter, in a given dynamic force generator, the positioning of the unbalanced masses relative to one other.

Figure 8A:
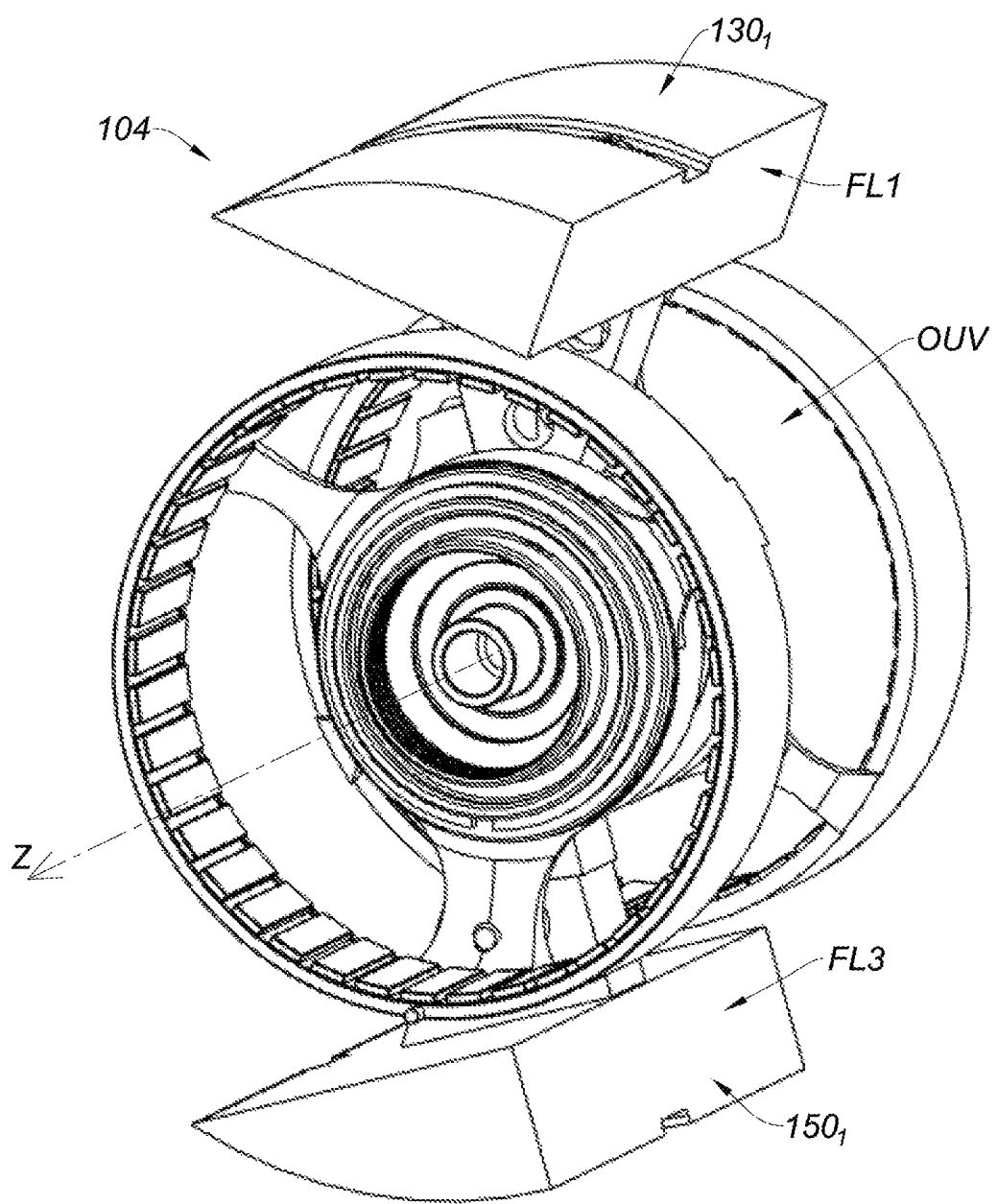
FIG. 8, which comprises FIGS. 8(a) and (8b), shows a variant embodiment of a dynamic force generator as shown in FIGS. 1 to 3 and 7, with a particular design of the unbalanced masses, and more precisely a general perspective view in FIG. 8(a) and a basic front view in FIG. 8(b)
Figure 8B:
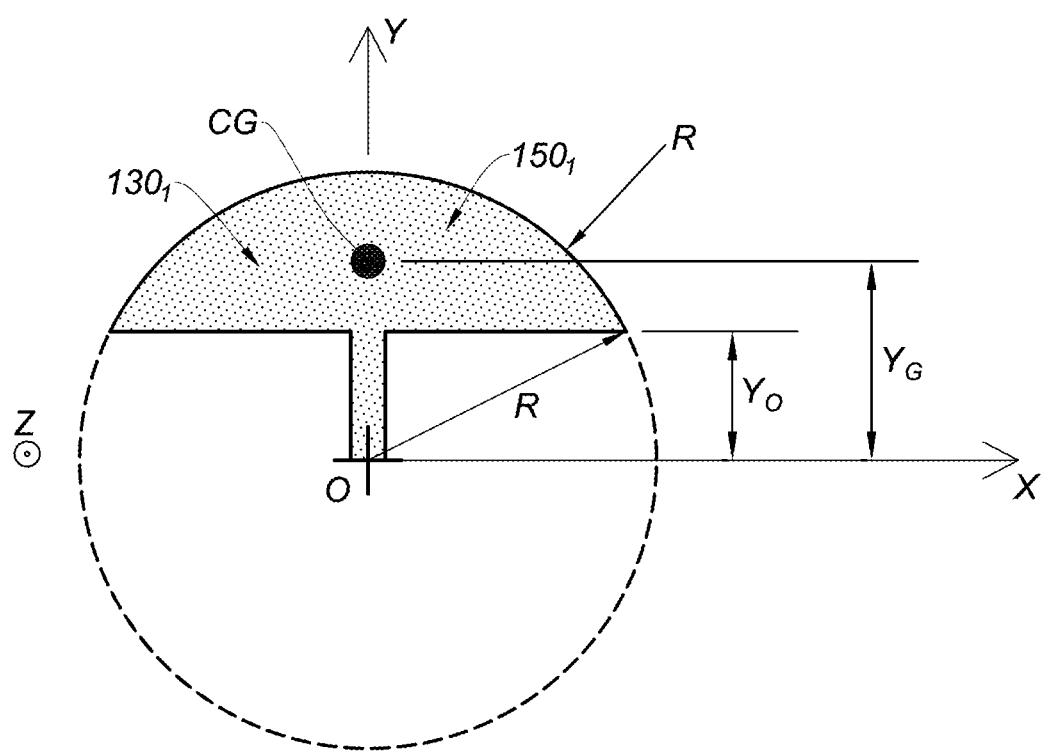

Another variant embodiment is shown in FIG. 8, which comprises FIGS. 8(a) and 8(b).

In the latter, and in comparison with the preceding figures, the dynamic force generator 104 has adjacent unbalanced masses, of a different form from those presented in the preceding figures. In fact, in FIGS. 8(a) and 8(b), the unbalanced masses $130_1$, $150_1$ each have a cross-section, taken in the plane perpendicular to shaft 110, in the form of a half-segment of a disk, whose respective flat lateral faces FL1, FL3 are likely to come into contact with one other, optionally via a damping means (not shown in FIG. 8). In other words, as can be seen in FIG. 8(b), when the two unbalanced masses $130_1$, $150_1$ are in contact they define, together, a cross-section in the form of a segment of a disk.

This design makes it possible to maximize the force/mass ratio generated by the two unbalanced masses $130_1$, $150_1$ (taken together). In fact, this ratio is written as $Y_G\omega^2$ where $Y_G$ is the distance between the centre of rotation O (located on the shaft 110) and the position of the centre of gravity $C_G$ of the two unbalanced masses $130_1$, $150_1$ taken together and $\omega$ is the rotary speed of the two unbalanced masses. This therefore comes down to maximizing the value of $Y_G$. Maximizing $Y_G$ comes down to "filling" the region located above $Y_O$. Incidentally, therefore, we try to maximize Y0. As this region is, moreover, limited by the circle of radius R, which corresponds to the envelope of maximum overall dimensions of the unbalanced masses $130_1$ and $150_1$, we end up filling a region that corresponds to a segment of a disk.

In other words, with this particular design, a maximum force can be generated, for a given mass and density of the set of two unbalanced masses. Conversely, if, taking into account the application envisaged, the maximum force to be generated is defined, it is possible to minimize the total mass of the two unbalanced masses, relative to the preceding designs. This is advantageous as it makes it possible to reduce the weight of the dynamic force generator without restricting its performance. This is particularly advantageous for applications for aircraft, in particular for rotating-wing aircraft (helicopters), whose performance is very sensitive to weight.

Figure 9:
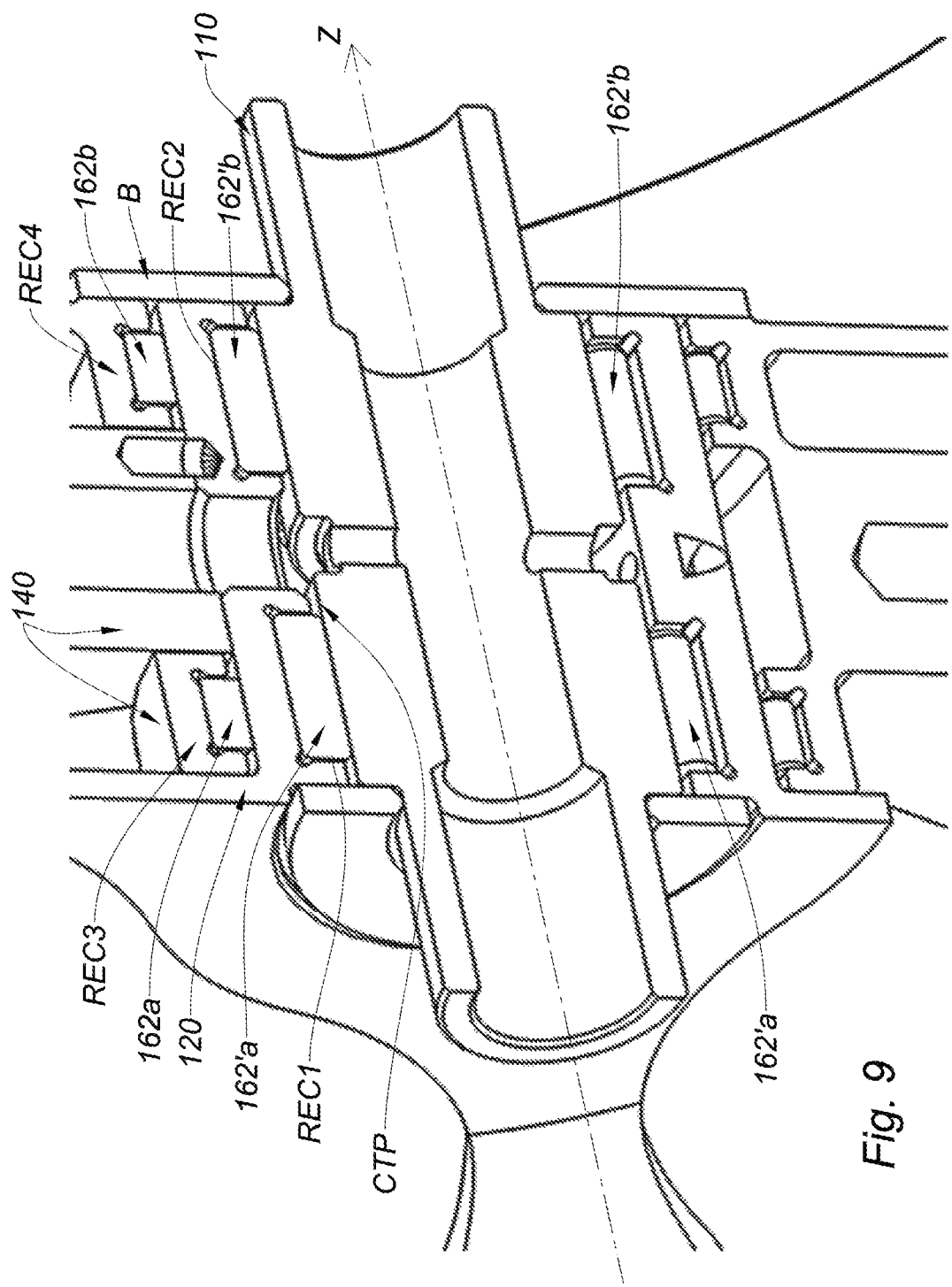
FIG. 9 is another variant embodiment of a dynamic force generator as shown in FIGS. 1 to 3 and 7.

Another dynamic force generator according to a variant embodiment is shown in FIG. 9.

In this variant, each bearing R1, R2 is replaced with a row of needle rollers 162'a, 162'b (i.e. a needle-roller bearing without the associated cage). In this design, the preloading spring RP is no longer necessary, nor the associated circlip 194.

This design offers several advantages.

It offers an even more compact solution. This compactness also means a reduction of the diameter of rotational guidance, and therefore of the losses and of the power consumed for driving the unbalanced masses.

It also offers a lighter-weight solution relative to the use of complete bearings.

It also offers a simpler solution. In fact, the preloading spring and the circlip are replaced with a stop B, so that installation is simplified.

The rows of needle rollers 162'a, 162'b, 162a, 162b are then guided by receptacles REC1, REC2, REC3 and REC4, respectively. Advantageously, the receptacles REC1, REC2 are made in the guide bores of the unbalanced mass associated with the rotor 120 and, as shown in FIG. 9, rather than in the shaft 110 in order to benefit from the retention of lubricant under the effect of the centrifugal force.

Moreover, advantageously, as shown in FIG. 9, two other rows of needle rollers (which may optionally be provided with their cage to form needle-roller bearings, but advantageously without their respective cages) are provided between the two rotors, similarly to what was described with reference to FIG. 6.

It should be noted that this variant embodiment may of course employ unbalanced masses $130_1$, $150_1$ shown in FIGS. 8(*a*) and 8(*b*). Yet another dynamic force generator 103 according to a variant embodiment is shown in FIG. 10.

In this variant, the unbalanced masses 130, 150 are no longer adjacent, but nested. However, in this variant, there is no longer any parasitic moment, for the reasons mentioned above.

Figure 10A:
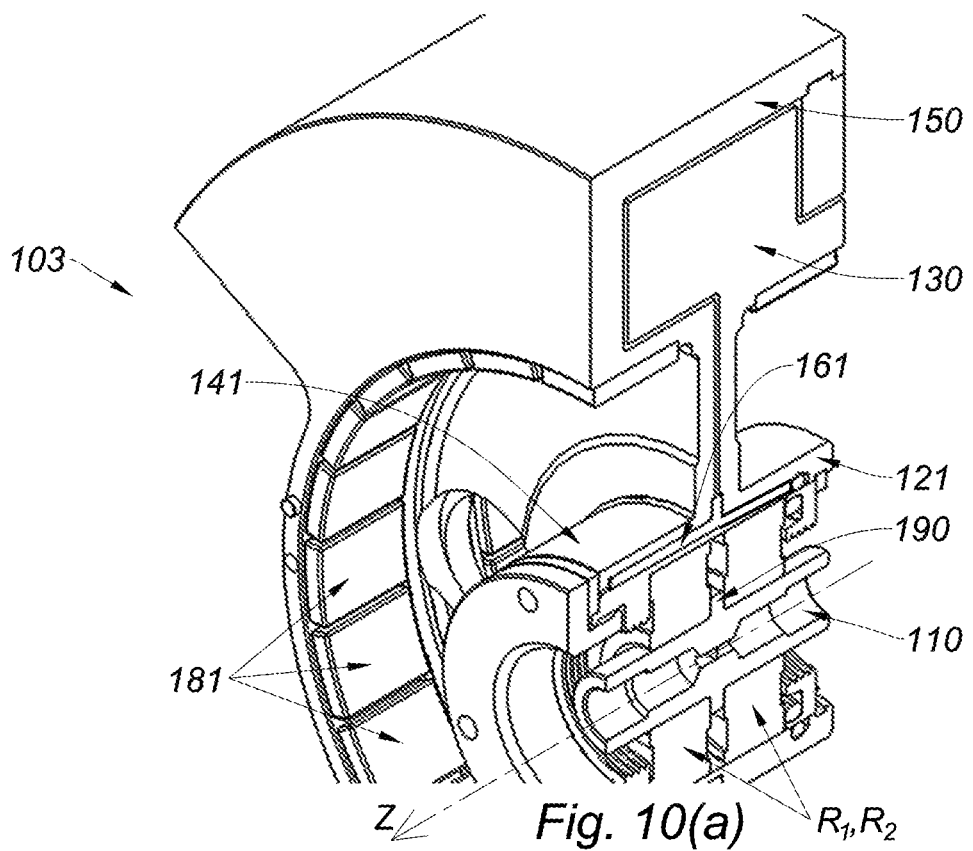
FIGS. 10(a) and 10(b), shows yet another variant of the dynamic force generator shown in FIGS. 1 to 3 and more precisely, in FIG. 10(a), a first partial sectional view and in FIG. 10(b) a second partial sectional view, along the same cutting plane as in FIG. 10(a)
Figure 10B:
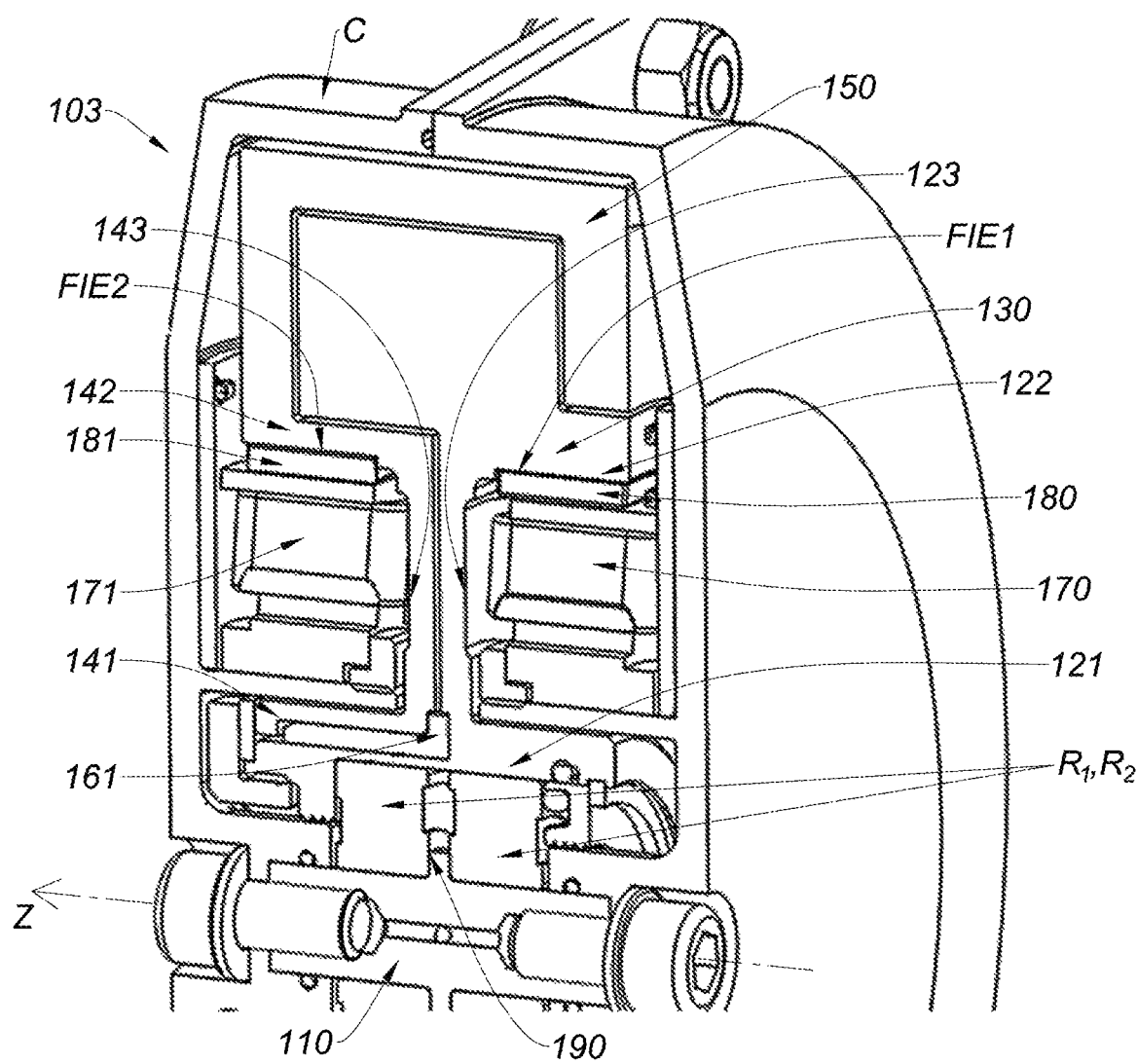

Moreover, in FIG. 10, the unbalanced mass 130 is integral with the internal bore 121 of the first rotor 120. This means that the internal bore 121 of the first rotor is formed as a single piece with the unbalanced mass 130. It would, however, be possible to envisage, as in the preceding figures, an unbalanced mass 130 fixed to the internal bore 121 of the first rotor 120.

Similarly, in FIG. 10, the unbalanced mass 150 is integral with the internal bore 141 of the second rotor 140. This means that the internal bore 141 of the second rotor is formed as a single piece with the unbalanced mass 150. It would, however, be possible to envisage, as in FIGS. 1 to 6, an unbalanced mass 150 fixed to the internal bore 141 of the second rotor 140.

Moreover, although FIG. 10 shows the case when a plain bearing 161 is used as the antifriction component, the antifriction component could, as a variant, be formed by rows of needle rollers as described above.

Figure 11:
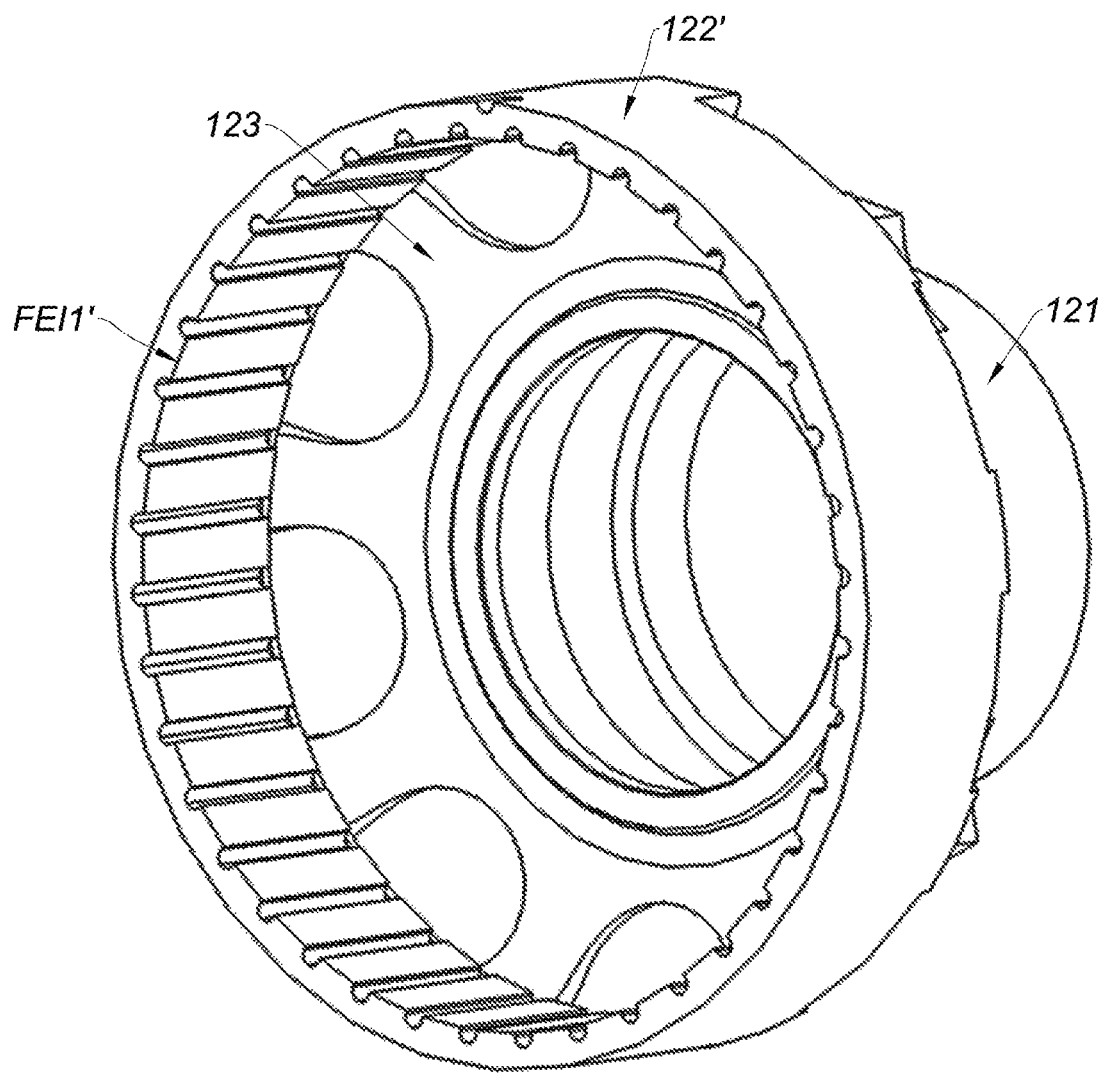
FIG. 11 shows a variant embodiment of the electric motor that may be envisaged for a dynamic force generator according to the invention.

FIG. 11 shows a partial view of a dynamic force generator that is not provided with a set of permanent magnets 180, 181 on the inner face FEI1, FEI2 of the external bore 122, 142 of the rotor in question 120, 140.

Instead, a ribbed inner face FEI1' is specified. This inner face FEI1' should then be made of a ferromagnetic material. This may be effected by providing an external bore made of a ferromagnetic material or else by the deposition of a ferromagnetic surface coating on this inner face FEI1.

Otherwise it remains unchanged.

This makes it possible to define a variable reluctance motor.

Whatever embodiment is envisaged, it should be noted that a dynamic force generator according to the invention envisages electromagnets (=electrical coils 170, 171 on its own ferromagnetic component; stator) that are more central (radially) than the sets of permanent magnets 180, 181 or, as appropriate, ferromagnetic ribbed faces, which are more off-centre. It should be noted that this is made possible by the radial and axial offset of the external bore 122, 142 relative to the internal bore 121, 122 that makes it possible to define, with the connecting zone 123, 143, a space for housing the electromagnets 170, 171.

In other words, the stator is on the inside and the rotor is on the outside (radially). More precisely, with the design proposed here, the sets of permanent magnets 180, 181 or, as appropriate, the ferromagnetic slots are placed on the largest diameter available inside the trajectory of the unbalanced masses, the latter defining the overall dimensions of the dynamic force generator, only being separated by the thickness of the external bore, of the permanent magnets or of the ferromagnetic slots.

This arrangement makes it possible to have a drive torque that is as high as possible for given overall dimensions.

Moreover, regardless of the embodiment envisaged, it should be noted that bearings R1, R2 are only used between the supporting shaft 110, 110' and the first rotor 120. To ensure rotation between the two rotors 120, 140 of one and the same dynamic force generator, the invention specifies an antifriction component 160, 161, which means far smaller overall dimensions and lower weight than the use of additional bearings such as taper roller bearings.

Moreover, the fact that this antifriction component 160, 161 is located between the two rotors 120, 140 offsets it radially relative to the bearings R1, R2. This allows the antifriction component to have a certain area of contact that means it is subject to less stress (centrifugal force divided by the area of contact of this antifriction component), which is favourable for its service life and therefore that of the dynamic force generator.

Additionally, still regardless of the embodiment envisaged, the bearings R1, R2 as well as the antifriction component 160, 161 (plain bearing of various designs or needle rollers) are advantageously centred axially, as shown in the accompanying figures. In other words, in operation, the resultant (radial) force associated with the two unbalanced masses in one and the same dynamic force generator is well distributed both on the bearings R1, R2 and on the antifriction component 160, 161. This is favourable for the service life of a dynamic force generator.

Moreover, it should be noted that the use of said antifriction component 160, 161 will be even more advantageous when the rotors 120, 140 of one and the same dynamic force generator are driven in co-rotation. In this case, it is necessary to ensure that the co-rotating rotors of a given dynamic force generator 100 are in counter-rotation with those of the other dynamic force generator 100'. In fact, in these conditions, the relative speeds between the two rotors 120, 140 of one and the same dynamic force generator remain in a moderate range and most often are low to zero. Therefore there is little overall stress on the antifriction component 160, 161. This is once again a little more justification, if such were needed, of the benefit of not having additional bearings.

Figure 12:
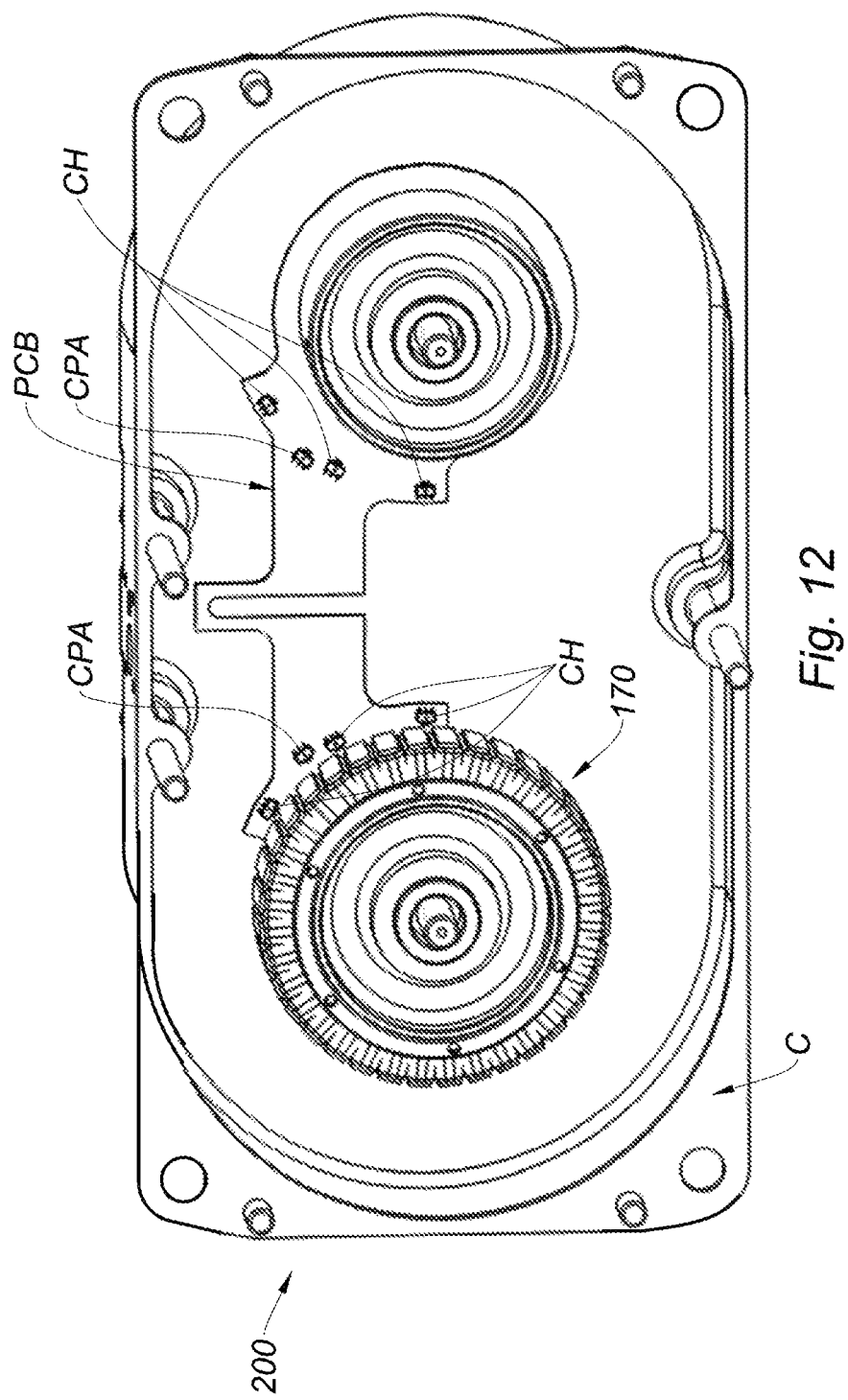
FIG. 12 shows the arrangement of the circuit board for managing control of the current sent to the stator of each electric motor present in an actuator.

FIG. 12 shows the arrangement of the PCB circuit board in an actuator 200, for managing control of the stators (a single stator electromagnet 170 is shown in FIG. 12).

The configuration described with reference to FIG. 12 is usable with the embodiments employing permanent magnets on each rotor, and therefore excludes the embodiment described with reference to FIG. 11.

The PCB circuit board is mounted between the housing C and each electromagnet 170.

This PCB circuit board easily makes it possible to supply electric current to each electrical coil whose ends are soldered to this board.

For a given stator, electrical switching from one coil to another is advantageously controlled by Hall cells CH, mounted on the PCB circuit board, and operating in all-or-nothing mode. In FIG. 12, we note, for example, the presence of three Hall cells CH for the stator 170, for three-phase operation (3 coils per stator).

To provide phase control, each rotor may be provided with a sensor CPA supplying information on angular position at each turn of the rotor in question. This sensor CPA may for example be a top tour sensor.

In the case when permanent magnets ("brushless") are used for the rotors and with current supply by block (the 3 elementary coils of a stator receive current or not, depending on the rotor/stator relative position), the Hall cells CH may then be switched under the effect of the alternation of the axial magnetic field (North/South) generated by the rotation of the rotors. In this case, the Hall cells CH may be employed in combination with the sensor CPA to create an absolute position sensor.

This then avoids the use of an absolute position sensor mounted on the dynamic force generator.

In fact, the signals supplied by the Hall cells CH produce a clock signal, each rising or falling edge of which indicates an angular increment.

Thus, for example, the angular resolution of this set of sensors (the 3 Hall cells plus the sensor CPA) may reach, for N=20 pairs of North/South poles, a value of 3°. This resolution is compatible with an application that aims to counteract the harmful vibrational effects of a rotor (main or secondary) of a rotating-wing aircraft (helicopter). Moreover, the sense of rotation to be applied to each unbalanced mass may be determined from each clock pulse edge of the signals supplied by the Hall cells CH.

It should be noted that the magnetic track PM, PM', when it is provided, may then be used for increasing the accuracy of the sensor (at constant resolution) by compensating the quality—a possible average quality of the magnetic signal generated by the permanent magnets of the rotor. This magnetic track PM, PM' may also be used for increasing, if necessary, the angular resolution of the sensor.

Alternatively, the switching between the various coils of a stator may be controlled with a supply of alternating current (preferably sinusoidal), and not in blocks. This makes it possible to generate a little more torque, at equivalent power consumed and in steady state, and slightly decrease the acoustic noise level notably owing to the absence of fluctuation of the motor torque.

In this alternative, the Hall cells CH are not necessary since switching is managed in another way. Moreover, it is then advantageously desirable, in this alternative, to provide an absolute angular position sensor. The circuit board (not shown) is modified thereby, but nevertheless is still mounted between the housing C of the actuator 200 and each electromagnet 170, 171.

Said absolute angular position sensor may assume various forms.

Thus, we may envisage an absolute position sensor of the "resolver" type, which is based on an electromagnetic principle. We may also envisage the absolute position sensor proposed in document FR 3 031 589, which is based on an inductive principle. We may further envisage utilizing the magnetic track PM, PM' associated with a rotor. The magnetic field created by the magnetic track PM, PM' may be directly substituted with that created by the permanent magnets to provide switching.

In this alternative, the position signal supplied by the absolute position sensor can then be used for finding the angular position of each unbalanced mass as well as for providing control of the switching of the coils, which is then effected with the alternating current supply.

With this type of switching (alternating current), the permanent magnets are not necessary for providing switching. This does not, however, rule out the use of permanent magnets in this variant to provide drive of the rotors, just that these permanent magnets are not utilized for switching.

For this reason, the alternative described above is notably conceivable with a variable reluctance motor (FIG. 11; absence of permanent magnets).

For the motor, it is also possible to employ a so-called hybrid solution, in which variable reluctance is combined with permanent magnets. In this case, switching may be carried out either in blocks or with alternating current.

The actuator 200 comprises four stators, four rotors and four unbalanced masses. The circuit board, for example the PCB circuit board shown in FIG. 12, can therefore provide independent control of the four stators and therefore of the four rotors and of the four unbalanced masses. This makes it possible to control the amplitude, direction and phase of the resultant force of the four unbalanced masses. The rotary speed of each unbalanced mass can be supplied by a common reference, which may for example be given, in the case of aircraft applications, by a frequency sensor supplying the rotation frequency of the engine of the aircraft, for example the main rotor for a helicopter.

Finally, it should be noted that the dynamic force generator and the actuator proposed in the invention are advantageous for treating the known problems, notably for applications for rotating-wing aircraft, of cold starting (−40° C.).

In fact, in the context of the invention, a pair of wound stators surround the bearings R1, R2 and/or needle-roller bearings 162'a, 162'b constituting the main source of power losses during low-temperature starting. One solution for overcoming a problem of excessive electrical consumption in these extreme conditions consists of providing a strategy, which will be even more effective, of preheating the bearings and needle rollers by supplying direct current to the coils prior to starting.

In this case, a temperature sensor CTP may be integrated in the dynamic force generator. Advantageously, it is provided at the level of the shaft 110, 110' and/or advantageously positioned near the bearings R1, R2 or, as appropriate, the rows of needle rollers 162'a, 162'b (cf. FIG. 7 for example for the bearings R1, R2; FIG. 9 in the case of the rows of needle rollers). This makes it possible to trigger this preliminary local preheating if necessary by a simple Joule effect in the coils if the measured temperature is below a critical threshold, and then start up rotation once the critical temperature threshold is exceeded.

Quick starting of the dynamic force generator, even at −40° C., is thus made possible.

This also makes it possible to envisage the use of a grease whose low-temperature characteristics are certainly less favourable (in terms of losses) but whose high-temperature characteristics favour the service life of the bearings and/or needle rollers.

The invention claimed is:

1. Dynamic force generator comprising:
    a supporting shaft;
    a first rotor comprising
        an internal bore housing said supporting shaft and at least two bearings or at least two rows of needle rollers, arranged between the supporting shaft and the internal bore so that the first rotor is mounted rotatably in relation to said supporting shaft,
        an external bore offset radially and axially relative to the internal bore and comprising either an inner face provided with a first set of permanent magnets or a ribbed inner face made of ferromagnetic material,
        a connecting zone between the internal bore and the external bore of the first rotor, said connecting zone defining, with the external bore, a space intended for housing an electromagnet able to interact with the first set of permanent magnets or with said ribbed inner face, made of ferromagnetic material, of the external bore of this first rotor, in order to constitute an electric motor for the first rotor, a first unbalanced mass fixed to or formed integrally with the internal bore of the first rotor and mounted opposite an outer face of the external bore of the first rotor;

a second rotor mounted rotatably in relation to the first rotor, via an antifriction component provided between the first rotor and the second rotor, this second rotor comprising:

an internal bore housing the internal bore of the first rotor, so that said internal bores of the first and second rotors are concentric, an external bore offset radially and axially relative to the internal bore of the second rotor and comprising either an inner face provided with a second set of permanent magnets or a ribbed inner face made of ferromagnetic material, a connecting zone between the internal bore of the second rotor and the external bore of the second rotor, said connecting zone defining, with the external bore of the second rotor, a space intended for housing an electromagnet able to interact with the second set of permanent magnets or said ribbed inner face, made of ferromagnetic material, of the external bore of this second rotor, in order to constitute an electric motor for the second rotor; and a second unbalanced mass fixed to or formed integrally with the internal bore of the second rotor and mounted opposite an outer face of the external bore of the second rotor.

2. Dynamic force generator according to claim 1, wherein said antifriction component is a plain bearing, employing an antifriction coating, a surface treatment or a sleeve bearing, arranged between the internal bore of the first rotor and the internal bore of the second rotor.

3. Dynamic force generator according to claim 1, wherein said antifriction component comprises at least two rows of needle rollers arranged between the internal bore of the first rotor and the internal bore of the second rotor.

4. Dynamic force generator according to claim 1, wherein:
the bearings or the rows of needle rollers arranged between the supporting shaft and the internal bore of the first rotor are centred axially; and/or
the antifriction component is centred axially.

5. Dynamic force generator according to claim 1, wherein the bearings arranged between the supporting shaft and the internal bore of the first rotor are selected from ball bearings, needle-roller bearings or taper roller bearings.

6. Dynamic force generator according to claim 1, wherein the external bore of the first and/or of the second rotor is made of a ferromagnetic material.

7. Dynamic force generator according to claim 1, wherein a first axial end of the internal bore of the first rotor, located opposite the corresponding connecting zone, is in the form of at least one helicoidal groove with pitch oriented so as to cause the grease contained in said generator to return to the bearings or to the rows of needle rollers.

8. Dynamic force generator according to claim 7, further comprises a component located against a peripheral wall of the internal bore of the first rotor, said peripheral wall forming a second axial end of the internal bore of the first rotor, opposite the first axial end, said component being provided with at least one helicoidal groove having a pitch opposite to that of the axial end of the internal bore of the first rotor.

9. Dynamic force generator according to claim 1, wherein the external bore of the first and/or of the second rotor comprises a magnetic track.

10. Dynamic force generator according to claim 1, wherein, for each of the first and second rotors, the dynamic force generator further comprises a temperature sensor arranged on the supporting shaft.

11. Dynamic force generator according to claim 1, wherein the dynamic force generator further comprises at least one permanent magnet, called indexing magnet, arranged to hold the unbalanced masses in opposition, at an angle of 180°, when the generator is at rest, said unbalanced masses being, for this purpose, either made of a ferromagnetic material or of a non-magnetic material but then comprising a ferromagnetic plate.

12. Dynamic force generator according to claim 1, wherein the unbalanced masses are adjacent or nested.

13. Dynamic force generator according to claim 1, wherein the unbalanced masses are adjacent, and at least one of said unbalanced masses comprises, on at least one of the lateral faces of said unbalanced mass, a damping component.

14. Dynamic force generator according to claim 13, wherein when the unbalanced masses are adjacent, each unbalanced mass has a section, taken in a plane perpendicular to the direction of the supporting shaft, in the form of a half-segment of a disk.

15. Actuator comprising:
at least two dynamic force generators according to claim 1, arranged so that their supporting shafts are parallel;
a housing; and for each of the two dynamic force generators:
at least one first electromagnet, fixed on the housing and housed in a space formed between said housing, the external bore and the connecting zone between the internal bore and the external bore of the first rotor of the dynamic force generator, so that said at least one first electromagnet is located facing the first set of permanent magnets or with said ribbed inner face made of ferromagnetic material of the external bore;
at least one second electromagnet, fixed on the housing and housed in a space formed between said housing, the external bore and the connecting zone between the internal bore and the external bore of the second rotor of the dynamic force generator, so that said at least one second electromagnet is located facing the second set of permanent magnets or with said ribbed inner face made of ferromagnetic material of the external bore.

16. Actuator according to claim 15, in which the supporting shaft of each dynamic force generator is fixed on the housing.

17. Actuator according to claim 15, comprising a circuit board mounted between the housing and each electromagnet.

18. Actuator according to claim 17, wherein the circuit board comprises, for each rotor provided with a series of permanent magnets, three Hall cells and a position sensor able to supply information on angular position at each turn of the rotor.

* * * * *